United States Patent
Noh et al.

(10) Patent No.: US 10,742,364 B2
(45) Date of Patent: *Aug. 11, 2020

(54) METHOD FOR ESTABLISHING DOWNLINK HARQ-ACK TIMING AND APPARATUS THEREFOR

(71) Applicant: KT CORPORATION, Gyeonggi-do (KR)

(72) Inventors: Minseok Noh, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,513

(22) Filed: Aug. 16, 2019

(65) Prior Publication Data

US 2019/0393995 A1   Dec. 26, 2019

Related U.S. Application Data

(63) Continuation of application No. 15/024,873, filed as application No. PCT/KR2014/008708 on Sep. 18, 2014, now Pat. No. 10,432,361.

(30) Foreign Application Priority Data

Sep. 26, 2013   (KR) .................. 10-2013-0114763
Nov. 15, 2013   (KR) .................. 10-2013-0138703
Mar. 10, 2014   (KR) .................. 10-2014-0027531

(51) Int. Cl.
*H04L 1/18*   (2006.01)
*H04L 5/14*   (2006.01)
*H04L 5/00*   (2006.01)

(52) U.S. Cl.
CPC .......... *H04L 1/1861* (2013.01); *H04L 1/1854* (2013.01); *H04L 5/14* (2013.01); *H04L 5/001* (2013.01)

(58) Field of Classification Search
None
See application file for complete search history.

(56) References Cited

U.S. PATENT DOCUMENTS 9,319,211 B2   4/2016   Larsson et al.
9,813,215 B2   11/2017   Seo et al.
(Continued)

FOREIGN PATENT DOCUMENTS

CN         103312470 A      9/2013
KR    10-2012-0120024 A    11/2012
(Continued)

OTHER PUBLICATIONS

Ericsson et al., "HARQ and scheduling timing for eIMTA", R1-133418, 3GPP TSG-RAN WG1 #74, Barcelona, Spain, Aug. 19-23, 2013.
(Continued)

*Primary Examiner* — Robert M Morlan
(74) *Attorney, Agent, or Firm* — IP Legal Services, LLC

(57) ABSTRACT

Provided area a method for establishing downlink (DL) HARQ-ACK timing, and an apparatus therefor. The method establishes downlink HARQ-ACK timing when a primary cell and a secondary cell having different duplex modes are established for a user equipment. The user equipment receives a DL signal on the secondary cell. The user equipment applies HARQ-ACK timing established to be used in the duplex mode of the primary cell as HARQ-ACK timing regarding the received downlink signal.

6 Claims, 33 Drawing Sheets

(56) References Cited

U.S. PATENT DOCUMENTS

| | | |
|---|---|---|
| 2010/0246456 A1 | 9/2010 | Suo et al. |
| 2012/0269180 A1 | 10/2012 | Li et al. |
| 2014/0153449 A1 | 6/2014 | Seo et al. |
| 2014/0321338 A1 | 10/2014 | Park et al. |
| 2015/0055519 A1 | 2/2015 | Lin et al. |
| 2016/0006552 A1 | 1/2016 | Seo et al. |
| 2017/0310454 A1 | 10/2017 | He et al. |
| 2017/0353204 A1 | 12/2017 | He et al. |

FOREIGN PATENT DOCUMENTS

| | | |
|---|---|---|
| KR | 10-2013-0075620 A | 7/2013 |
| WO | 2012/124980 A2 | 9/2012 |

OTHER PUBLICATIONS

Research in Motion, UK Limited, "Design of HARQ and Scheduling Timing Linkage to Support Inter-band CA with Different TDD Configurations", R1-120336, 3GPP TSG RAN WG1 Meeting #68, Dresden, Germany Feb. 6-10, 2012.

Samsung, "Solutions for FDD-TDD Joint Operation", R1-133102, 3GPP TSG RAN WG1 #74, Barcelona, Spain, Aug. 19-23, 2013.

Etri, "Discussion on FDD-TDD joint operation solutions", R1-133184, 3GPP TSG RAN WG1 Meeting #74, Barcelona, Spain, Aug. 19-23, 2013.

———— BACKHAUL LINK WITHIN CLUSTER

—·—·— BACKHAUL LINK BETWEEN SMALL CELL AND MACRO CELL

——— BACKHAUL LINK WITHIN CLUSTER
―‧―‧― BACKHAUL LINK BETWEEN SMALL CELL AND MACRO CELL

FIG.8

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

FIG. 9

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

FIG.10

| SET # | (PRIMARY CELL UL/DL CONFIGURATION, SECONDARY CELL UL/DL CONFIGURATION) | DL-REFERENCE UL/DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(0,2),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG.11

| UL/DL CONF. | 0 | 1 | 2 | 3 | 4 | 5 | 6 | 7 | 8 | 9 |
|---|---|---|---|---|---|---|---|---|---|---|
| 0 | - | - | 6, 5 (FDD SCELL) | -, 5 (FDD SCELL) | 4, 5 (FDD SCELL) | - | - | 6, 5 (FDD SCELL) | -, 5 (FDD SCELL) | 4, 5 (FDD SCELL) |
| 1 | - | - | 7, 6, 5 (FDD SCELL) | 4, 5 (FDD SCELL) | - | - | - | 7, 6, 5 (FDD SCELL) | 4, 5 (FDD SCELL) | - |
| 2 | - | - | 8, 7, 4, 6, 5 (FDD SCELL) | - | - | - | - | 8, 7, 4, 6, 5 (FDD SCELL) | - | - |
| 3 | - | - | 7, 6, 11, 10 (FDD SCELL) | 6, 5, 10 (FDD SCELL) | 5, 4, 10 (FDD SCELL) | - | - | - | - | - |
| 4 | - | - | 12, 8, 7, 11, 10 (FDD SCELL) | 6, 5, 4, 7, 10 (FDD SCELL) | - | - | - | - | - | - |
| 5 | - | - | 13, 12, 9, 8, 7, 5, 4, 11, 6, 10 (FDD SCELL) | - | - | - | - | - | - | - |
| 6 | - | - | 7, 10 (FDD SCELL) | 7, 10 (FDD SCELL) | 5, 10 (FDD SCELL) | - | - | 7, 10 (FDD SCELL) | 7, 10 (FDD SCELL) | - |

FIG. 12

| UL/DL CONF. | SUBFRAME n | | | | | | | | | |
|---|---|---|---|---|---|---|---|---|---|---|
| | 0 | 1 | 2 | 3 | 4 | 5 | 6 | 7 | 8 | 9 |
| 4 | - | - | 12, 8, 7, 11, 10, 9 (FDD SCELL) | 6, 5, 4, 7 | - | - | - | - | - | - |

FIG.13

| UL/DL CONF. | SUBFRAME n | | | | | | | | | |
|---|---|---|---|---|---|---|---|---|---|---|
| | 0 | 1 | 2 | 3 | 4 | 5 | 6 | 7 | 8 | 9 |
| 4 | - | - | 12, 8, 7, 11 | 6, 5, 4, 7, 11, 10 (FDD SCELL) | - | - | - | - | - | - |

FIG. 14

| UL/DL CONF. | 0 | 1 | 2 | 3 | 4 | 5 | 6 | 7 | 8 | 9 |
|---|---|---|---|---|---|---|---|---|---|---|
| 0 | - | - | 6, 5 (FDD SCELL) | 7, 5 (FDD SCELL) OR 4, 5 (FDD SCELL) | 4, 5 (FDD SCELL) OR 4 | - | - | 6, 5 (FDD SCELL) | 7, 5 (FDD SCELL) OR 4, 5 (FDD SCELL) | 4, 5 (FDD SCELL) OR 4 |
| 1 | - | - | 7, 6, 5 (FDD SCELL) | 4, 5 (FDD SCELL) | - | - | - | 7, 6, 5 (FDD SCELL) | 4, 5 (FDD SCELL) | - |
| 2 | - | - | 8, 7, 4, 6, 5 (FDD SCELL) | - | - | - | - | 8, 7, 4, 6, 5 (FDD SCELL) | - | - |
| 3 | - | - | 8, 9, 10, 11 (FDD SCELL) | 6, 7, 8 (FDD SCELL) | 5, 4, 6 (FDD SCELL) | - | - | - | - | - |
| 4 | - | - | 12, 8, 11, 10, 9, (FDD SCELL) | 6, 5, 4, 7, 8 (FDD SCELL) | - | - | - | - | - | - |
| 5 | - | - | 13, 12, 9, 8, 7, 5, 4, 11, 6, 10 (FDD SCELL) | - | - | - | - | - | - | - |
| 6 | - | - | 7, 6 (FDD SCELL) | 5, 6 (FDD SCELL) | 5, 4 (FDD SCELL) | - | - | 5, 6 (FDD SCELL) | 4, 5 (FDD SCELL) | - |

SUBFRAME n

FIG. 15

| UL/DL CONF. | SUBFRAME n | | | | | | | | | |
|---|---|---|---|---|---|---|---|---|---|---|
| | 0 | 1 | 2 | 3 | 4 | 5 | 6 | 7 | 8 | 9 |
| 4 | - | - | 12, 8, 11, 10, 9, 7 (FDD SCELL) | 6, 5, 4, 7 | - | - | - | - | - | - |

FIG.16

| UL/DL CONF. | SUBFRAME n | | | | | | | | | |
|---|---|---|---|---|---|---|---|---|---|---|
| | 0 | 1 | 2 | 3 | 4 | 5 | 6 | 7 | 8 | 9 |
| 4 | - | - | 12, 11, 10, 9 (FDD SCELL) | 6, 5, 4, 7, 8, 9 (FDD SCELL) | - | - | - | - | - | - |

FIG.17

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| FDD | | D | D | D | D | D | D | D | D | D | D |
| | | U | D | U | U | U | U | U | U | U | U |

FIG.18

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 1 | 5 ms | D | S | U | U | D | D | S | U | U | D |
| FDD | | D | D | D | D | D | D | D | D | D | D |
| | | U | U | U | U | U | U | U | U | U | U |

FIG.19

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| FDD | | D | D | D | D | D | D | D | D | D | D |
| | | U | U | U | U | U | U | U | U | U | U |

FIG.20

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| FDD | | D | D | D | D | D | D | D | D | D | D |
| | | U | U | U | U | U | U | U | U | U | U |

FIG.21

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| FDD | | D | D | D | D | D | D | D | D | D | D |
| | | D | U | U | U | U | U | U | U | U | U |

FIG.22

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| FDD | | D | D | D | D | D | D | D | D | D | D |
| | | U | U | U | U | U | U | U | U | U | U |

FIG.23

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 6 | 5 ms | D | S | U | U | U | D | S | U | U | D |
| FDD | | D | U | D | D | D | D | D | D | D | D |
| | | D | U | U | U | U | U | U | U | U | U |

METHOD FOR ESTABLISHING DOWNLINK HARQ-ACK TIMING AND APPARATUS THEREFOR

CROSS REFERENCE TO RELATED APPLICATIONS

This application is a Continuation of U.S. patent application Ser. No. 15/024,873 (filed on Mar. 25, 2016), which is a National Stage patent application of PCT International Patent Application No. PCT/KR2014/008708 (filed on Sep. 18, 2014) under 35 U.S.C. § 371, which claims priority to Korean Patent Application Nos. 10-2013-0114763 (filed on Sep. 26, 2013), 10-2013-0138703 (filed on Nov. 15, 2013), and 10-2014-0027531 (filed on Mar. 10, 2014), the teachings of which are incorporated herein in their entireties by reference.

TECHNICAL FIELD

The present disclosure relates to a method of establishing HARQ-ACK timing and an apparatus for the same. More particularly, the present disclosure relates to a method of establishing HARQ-ACK timing to select an uplink subframe for transmitting a downlink HARQ-ACK thereon when carrying out carrier aggregation (CA) and a joint operation in which the duplex modes of two or more cells are established as time division duplex (TDD) and frequency division duplex (FDD) and an apparatus for realizing the same.

BACKGROUND ART

Due to the development of communications systems, consumers, such as companies and individuals, commonly use various types of wireless terminals. Current mobile communications systems belonging to a $3^{rd}$ generation project partnership (3GPP) family, such as long-term evolution (LTE) and LTE-Advanced, are high-speed, high capacity communications systems grown out of voice-centric services. These systems can transmit and receive various types of data, such as video data or wireless data. Thus, it is necessary to develop technologies to wirelessly transmit a large amount of data at a high transmit rate similar to those of wired communications networks. Deployments, such as a plurality of cells or a plurality of small cells, have been introduced. Accordingly, it is required to develop a technology and a method for applying carrier aggregation (CA) in a variety of deployment scenarios. In addition, it is also required to develop a technology for supporting joint operations and CA, which perform signal transmission and reception among a plurality of base stations or in a heterogeneous network when two more cells are established in different duplex modes, such as time division duplex (TDD) and frequency division duplex (FDD). For example, the efficiency of an entire network may be affected by the manner of establishing downlink HARQ-ACK timing in a joint operation in which a primary cell (Pcell) and a secondary cell (Scell) have different duplex modes.

DISCLOSURE

Technical Problem

The present disclosure is intended to improve efficiency in communications by establishing downlink (DL) HARQ-ACK timing between a base station and user equipment (UE) when performing carrier aggregation (CA) and a joint operation in which two or more cells are established in different duplex modes, i.e. time division duplex (TDD) and frequency division duplex (FDD).

Technical Solution

An embodiment of the present disclosure provides a method of establishing, by a user equipment, DL HARQ-ACK timing when a primary cell (Pcell) and a secondary cell (Scell) having different duplex modes are established for the user equipment. The method includes: receiving, by the user equipment, a DL signal on the Scell; and applying, by the user equipment, HARQ-ACK timing established to be used in the duplex mode of the Pcell as HARQ-ACK timing regarding the received DL signal.

Another embodiment of the present disclosure provides a method of establishing, by a user equipment, DL HARQ-ACK timing in a mobile communications network in which a Pcell is established as a TDD Pcell and a Scell is established as an FDD Scell. The method includes: receiving, by the user equipment, a DL signal on the FDD Scell; and when an interval of a switch-point periodicity of an uplink (UL) subframe-specific DL association set established for the TDD Pcell is K, applying, by the user equipment, HARQ-ACK timing in which the K is added to the UL subframe-specific DL association set, as HARQ-ACK timing regarding the DL signal.

Further another embodiment of the present disclosure provides method of establishing, by a user equipment, DL HARQ-ACK timing in a mobile communications network in which a Pcell is established as a TDD Pcell and a Scell is established as an FDD Scell. The method includes: receiving, by the user equipment, a DL signal on the FDD Scell; and applying, by the user equipment, added HARQ-ACK timing to a single UL subframe within a switch-point periodicity established for the TDD Pcell, as HARQ-ACK timing regarding the DL signal.

Still another embodiment of the present disclosure provides a method of establishing, by a user equipment, DL HARQ-ACK timing in a mobile communications network in which a Pcell is established as a TDD Pcell and a Scell is established as an FDD Scell. The method includes: receiving, by the user equipment, a DL signal on the FDD Scell; and applying, by the user equipment, added HARQ-ACK timing to an UL subframe-specific DL association set of the TDD Pcell according to a sequence of a DL subframe in which the DL signal is transmitted, as HARQ-ACK timing regarding the DL signal.

Another embodiment of the present disclosure provides a method of establishing, by a base station, DL HARQ-ACK timing when establishing a Pcell and a Scell having different duplex modes for a user equipment. The method includes: transmitting, by the base station, a DL signal to the user equipment on the Scell; and receiving, by the base station, an HARQ-ACK in response to the DL signal from the user equipment, on an UL subframe to which HARQ-ACK timing established to be used in the duplex mode of the Pcell is applied.

Further another embodiment of the present disclosure provides a method of establishing, by a base station, DL HARQ-ACK timing in a mobile communications network in which a Pcell is established as a TDD Pcell and a Scell is established as an FDD Scell. The method includes: transmitting, by the base station, a DL signal to a user equipment on the FDD Scell; and when an interval of a switch-point periodicity of an UL subframe-specific DL association set established for the TDD Pcell is K, receiving, by the base station, HARQ-ACK timing regarding the DL signal from the user equipment, on an UL subframe to which HARQ-ACK timing in which the K is added to the UL subframe-specific DL association set is applied.

Still another embodiment of the present disclosure provides a method of establishing, by a base station, DL HARQ-ACK timing in a mobile communications network in which a Pcell is established as a TDD Pcell and a Scell is established as an FDD Scell. The method includes: transmitting, by the base station, a DL signal to user equipment on the FDD Scell; and receiving, by the base station, an HARQ-ACK in response to the DL signal from the user equipment, on a single UL subframe within a switch-point periodicity established for the TDD Pcell, wherein added HARQ-ACK timing is applied to the UL subframe.

Another embodiment of the present disclosure provides a method of establishing, by a base station, DL HARQ-ACK timing in a mobile communications network in which a Pcell is established as a TDD Pcell and a Scell is established as an FDD Scell. The method includes: transmitting, by the base station, a DL signal to user equipment on the FDD Scell; and receiving, by the base station, an HARQ-ACK in response to the DL signal from the user equipment, on an UL subframe in which added HARQ-ACK timing is applied to an UL subframe-specific DL association set of the TDD Pcell according to a sequence of a DL subframe in which the DL signal is transmitted.

Further another embodiment of the present disclosure provides a user equipment for establishing DL HARQ-ACK timing when a Pcell and a Scell having different duplex modes are established for the user equipment. The user equipment includes: a receiver and a controller. The receiver is configured to receive a DL signal on the second cell. The controller is configured to apply HARQ-ACK timing established to be used in the duplex mode of the Pcell as HARQ-ACK timing regarding the received DL signal.

Still another embodiment of the present disclosure provides a user equipment for establishing DL HARQ-ACK timing in a mobile communications network in which a Pcell is established as a TDD Pcell and a Scell is established is established as an FDD Scell. The user equipment includes: a receiver and a controller. The receiver is configured to receive a downlink signal on the FDD secondary cell. When an interval of a switch-point periodicity of an UL subframe-specific DL association set established for the TDD Pcell is K, the controller is configured to apply HARQ-ACK timing in which the K is added to the UL subframe-specific DL association set, as HARQ-ACK timing regarding the DL signal.

Another embodiment of the present disclosure provides a user equipment for establishing DL HARQ-ACK timing in a mobile communications network in which a Pcell is established as a TDD Pcell and a Scell is established is established as an FDD Scell. The user equipment includes: a receiver and a controller. The receiver is configured to receive a downlink signal on the FDD secondary cell. The controller is configured to apply added HARQ-ACK timing to a single UL subframe within a switch-point periodicity established for the TDD Pcell, as HARQ-ACK timing regarding the DL signal.

Further another embodiment of the present disclosure provides a user equipment for establishing DL HARQ-ACK timing in a mobile communications network in which a Pcell is established as a TDD Pcell and a Scell is established is established as an FDD Scell. The user equipment includes: a receiver and a controller. The receiver is configured to receive a downlink signal on the FDD secondary cell. The controller is configured to apply added HARQ-ACK timing to an UL subframe-specific DL association set of the TDD Pcell according to a sequence of a DL subframe in which the DL signal is transmitted, as HARQ-ACK timing regarding the DL signal.

Still another embodiment of the present disclosure provides a base station for establishing DL HARQ-ACK timing when a Pcell and a Scell having different duplex modes are established for user equipment. The base station includes: a transmitter and a receiver. The transmitter is configured to transmit a DL signal to the user equipment on the Scell. The receiver is configured to receive an HARQ-ACK in response to the DL signal from the user equipment on an UL subframe to which HARQ-ACK timing established to be used in the duplex mode of the Pcell is applied.

Another embodiment of the present disclosure provides a base station for establishing DL HARQ-ACK timing in a mobile communications network in which a Pcell is established as a TDD Pcell and a Scell is established as an FDD Scell. The base station includes: a transmitter and a receiver. The transmitter is configured to transmit a DL signal to the user equipment on the Scell. When an interval of a switch-point periodicity of an UL subframe-specific DL association set established for the TDD Pcell is K, the receiver is configured to receive HARQ-ACK timing regarding the DL signal from the user equipment, on an UL subframe to which HARQ-ACK timing in which the K is added to the UL subframe-specific DL association set is applied. The base station includes a controller configured to control the transmitter and the receiver.

Further another embodiment of the present disclosure provides a base station for establishing DL HARQ-ACK timing in a mobile communications network in which a Pcell is established as a TDD Pcell and a Scell is established as an FDD Scell. The base station includes: a transmitter, a receiver, and a controller. The transmitter is configured to transmit a DL signal to the user equipment on the Scell. The receiver is configured to receive an HARQ-ACK in response to the DL signal from the user equipment, on a single UL subframe within a switch-point periodicity established for the TDD Pcell, wherein added HARQ-ACK timing is applied to the UL subframe. The controller is configured to control the transmitter and the receiver.

Further another embodiment of the present disclosure provides a base station for establishing DL HARQ-ACK timing in a mobile communications network in which a Pcell is established as a TDD Pcell and a Scell is established as an FDD Scell. The base station includes: a transmitter, a receiver, and a controller. The transmitter is configured to transmit a DL signal to the user equipment on the Scell. The receiver is configured to receive an HARQ-ACK in response to the DL signal from the user equipment, on an UL subframe in which added HARQ-ACK timing is applied to an UL subframe-specific DL association set of the TDD Pcell according to a sequence of a DL subframe in which the DL signal is transmitted. The controller is configured to control the transmitter and the receiver.

Advantageous Effects

According to the present disclosure, it is possible to improve efficiency of transmitting an HARQ-ACK by applying DL HARQ-ACK timing in a joint operation and carrier aggregation (CA) of different duplex modes, i.e. time division duplex (TDD) and frequency division duplex (FDD).

DESCRIPTION OF DRAWINGS

FIG. 8 is a table illustrating a time division duplex (TDD) uplink (UL)—downlink (DL) configuration in a TDD frame structure.

FIG. 9 is a table illustrating downlink associations for TDD DL HARQ-ACK transmissions in the TDD UL-DL configuration illustrated in FIG. 8.

FIG. 10 is a table illustrating a reference TDD UL-DL configuration.

FIG. 11 is a table illustrating a timing relationship in Method a-2-1) according to an embodiment of the present disclosure.

FIG. 12 and FIG. 13 are tables illustrating cases in which TDD UL-DL configuration 4 in Method a-2-1) according to an embodiment of the present disclosure is a Pcell.

FIG. 14 is a table illustrating a timing relationship in Method a-2-2) according to an embodiment of the present disclosure.

FIG. 15 and FIG. 16 are tables illustrating cases in which TDD UL-DL configuration 4 in Method a-2-2) according to an embodiment of the present disclosure is a Pcell.

FIG. 17 to FIG. 23 represent exemplary cases in which TDD cells having TDD UL-DL configurations 0 to 6 and an FDD cell are subjected to CA for TDD-FDD joint operations.

MODE FOR INVENTION

Figure 1:
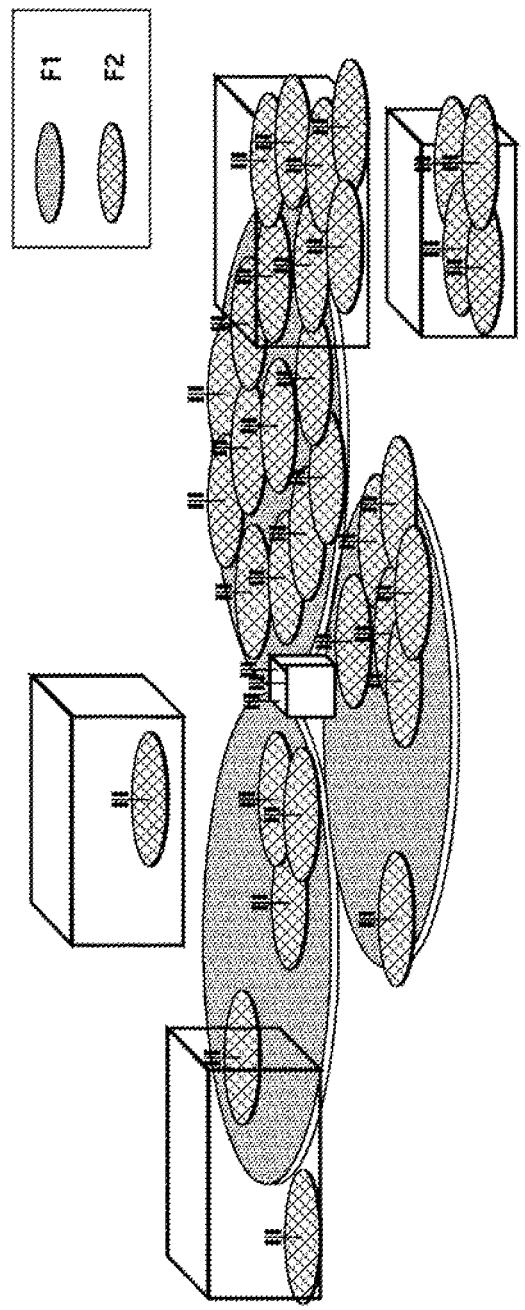
FIG. 1 is a diagram illustrating a small cell deployment according to an embodiment.

Reference will now be made in detail to embodiments of the present disclosure, examples of which are illustrated in the accompanying drawings. Throughout this document, reference should be made to the drawings, in which the same reference numerals and signs will be used to designate the same or like components. In the following description of the present disclosure, detailed descriptions of known functions and components incorporated herein will be omitted in the case that the subject matter of the present disclosure may be rendered unclear thereby.

Herein, a wireless communications system may be widely distributed in order to provide various types of communications services, such as a voice service, a data packet service, or the like. Here, a wireless communications system includes sets of user equipment (UE) and base stations (BSs) or evolved node Bs (eNBs). As used in the specification, the term "user equipment" has a comprehensive meaning indicating a wireless communications terminal, and should be interpreted as not only indicating the user equipment in the wideband code division multiple access (WCDMA) scheme, the long-term evolution (LTE) scheme, the high speed packet access (HSPA) scheme, and the like, but also including all of a mobile station (MS), a user terminal (UT), a subscriber station (SS), a wireless device, and the like, in the global system for mobile communications (GSM) scheme. Hereinafter, in the specification, the term "user equipment" will also be referred to as "UE."

A base station or a cell typically refers to a station that communicates with the user equipment. The base station may be referred to using another term, such as a node-B, an evolved node-B (eNB), a sector, a site, a base transceiver system (BTS), an access point, a relay node, a remote radio head (RRH), a radio unit (RU), a small cell, or the like.

In the specification, the base station or cell should be interpreted as having a comprehensive meaning indicating a partial area or a function covered by a base station controller (BSC), a node-B in the WCDMA scheme, an eNB or a sector (site) in the LTE scheme, or the like. The base station or cell comprehensively includes a variety of coverage areas, such as a mega cell, a macro cell, a microcell, a picocell, a femtocell, and a variety of communications ranges of a relay node, an RRH, an RU, and a small cell.

Each of the variety of cells as enumerated above is controlled by a base station, and the base station may be interpreted in two senses. The base station i) may be an apparatus that provides a mega cell, a macro cell, a microcell, a picocell, a femtocell, or a small cell in relationship to a wireless area, or ii) may indicate the wireless area. In i), base stations may be apparatuses providing wireless areas are controlled by the same entity or entire apparatuses interacting with one another to form a wireless area in a coordinated manner. For example, the base station may be referred to as an eNB, an RRH, an antenna, an RU, a low power node (LPN), a point, a transceiver point, a transmission point, a reception point, and the like depending on the configuration of the wireless area. In ii), in terms of a user or in terms of an adjacent base station, the wireless area in which a signal is received or transmitted can be referred to as a base station.

Thus, the base station may be referred to as the mega cell, the macro cell, the microcell, the picocell, the femtocell, the small cell, the RRH, the antenna, the RU, the LPN, the point, the eNB, the transceiver point, the transmission point, and the reception point.

In the specification, the user equipment and the base station are comprehensively referred to as two types of transmission/reception entities for realizing technologies or technical concepts described herein and are not limited by terms or words that are explicitly defined. The user equipment and the base station are comprehensively used as two transmission/reception (uplink and downlink) entities for realizing technologies or technical concepts described herein and are not limited by terms or words that are explicitly defined. Here, the term "uplink (UL)" relates to data transmission/reception in which data is transmitted from the user equipment to the base station, whereas the term "downlink (DL)" relates to data transmission/reception in which data is transmitted from the base station to the user equipment.

There are no limitations in multiple access technologies applied to the wireless communications system. A variety of multiple access methods, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA, can be used. An exemplary embodiment of the present disclosure is applicable for the allocation of resources in asynchronous wireless communications evolving into long-term evolution (LTE) and LTE-Advanced through GSM, WCDMA, and high speed packet access (HSPA) and synchronous wireless communications evolving into CDMA, CDMA-2000, and ultra-mobile broadband (UMB). The present disclosure should not be interpreted as being limited or restricted to a specific field of wireless communications and should be interpreted as including all technical fields to which the concept of the present disclosure is applicable.

Uplink transmission and downlink transmission may employ time division duplex (TDD) in which transmissions are performed at different fractions of time or frequency division duplex (FDD) in which transmissions are performed at different fractions of time.

In addition, a system such as LTE or LTE-Advanced constitutes a standard by forming an uplink and a downlink based on a single carrier wave or a pair of carrier waves. The uplink and the downlink transmit control information through a control channel, such as a physical downlink control channel (PDCCH), a physical control format indicator channel (PCFICH), a physical hybrid-ARQ indicator channel (PHICH), a physical uplink control channel (PUCCH), and an enhanced physical downlink control channel (EPDCCH), and are constituted of a data channel, such as a physical downlink shared channel (PDSCH) or a physical uplink shared channel (PUSCH), to transmit data.

Alternatively, it is possible to transmit control information using an enhanced or extended PDCCH (EPDCCH).

In the specification, the cell may refer to a transmission or transmission/reception point, the coverage of a signal transmitted from the transmission or transmission/reception point, or a component carrier having the coverage of the signal transmitted from the transmission or transmission/reception point.

The wireless communication system to which embodiments are applied may be a coordinated multi-point transmission/reception System (CoMP) system in which two or more transmission/reception points transmit a signal in a coordinated manner, a coordinated multi-antenna transmission system, or a coordinated multi-cell communications system. The CoMP system may include at least two multi-transmission/reception points and pieces of UE.

The multi-transmission/reception points may be a base station or a macro cell (hereinafter referred to as an "eNB") and at least one RRH connected to the eNB via a fiber optic cable or a optical fiber and controlled by wires. The RRH has high transmission power, or has low transmission power within the area of the macro cell.

Hereinafter, the downlink refers to communications from each multi-transmission/reception point to the UE or a path for such communications. The uplink refers to communications from the UE to the multi-transmission/reception point or a path for such communications. In the downlink, a transmitter may be a portion of the multi-transmission/reception point, and a receiver may be a portion of the UE. In the uplink, the transmitter may be a portion of the UE, and the receiver may be a portion of the multi-transmission/reception point.

Hereinafter, when a signal is transmitted/received via a channel, such as the PUCCH, PUSCH, PDCCH, EPDCCH, or physical PDSCH, it may be described that "a PUCCH, PUSCH, PDCCH, EPDCCH, or PDSCH is transmitted/received."

In addition, hereinafter, transmitting or receiving a PDCCH or transmitting or receiving a signal through the PDCCH may refer to transmitting or receiving an EPDCCH or transmitting or receiving a signal through the EPDCCH.

That is, the physical downlink control channel described hereinafter indicates the PDCCH or the EPDCCH, or is used as including both the PDCCH and the EPDCCH.

For the sake of explanation, the EPDCCH may be applied as an embodiment of the present disclosure to the portion described as being the PDCCH, and the PDCCH may be applied as an embodiment of the present disclosure to the portion described as being the EPDCCH.

In the meantime, high layer signaling described hereinafter includes radio resource control (RRC) signaling that transmits RRC information including an RRC parameter.

The eNB, an embodiment of the base station, performs downlink transmissions to pieces of UE. The eNB may transmit a physical downlink shared channel (PDSCH), which is a main channel for unicast transmissions, and a physical downlink control channel (PDCCH), through which downlink control information, such as scheduling necessary for the reception of the PDSCH, and scheduling approval information for transmissions through an uplink data channel (e.g. a physical uplink shared channel (PUSCH)) are transmitted. Hereinafter, the transmission of a signal through each channel will be described as the transmission of the relevant channel.

A small cell using a low-power node is considered as a means for dealing with rapid increases in the amount of mobile traffic. The low-power node refers to a node that uses lower transmission (Tx) power than typical macro-nodes.

According to carrier aggregation (CA) technology before 3GPP Release 11, it was possible to construct a small cell using a low-power remote radio head (RRH), i.e. one of geographically dispersed antennas, within the coverage area of a macro cell.

However, for the application of the above-mentioned CA technology, the macro cell and the RRH cell are constructed in such a manner as to be scheduled under the control of a single base station. Here, it is necessary to construct an ideal backhaul between the node of the macro cell and the RRH.

The ideal backhaul refers to a backhaul exhibiting a very high throughput and a very short time delay, as in a dedicated point-to-point (PTP) connection using optical fibers or a line-of-sight (LOS) microwave link.

In contrast, a backhaul, such as a digital subscriber line (xDSL) or a non-LOS microwave link, exhibiting a relatively low throughput and a relatively long delay is referred to as a non-ideal backhaul.

A plurality of serving cells may be aggregated using the above-mentioned CA technology, based on a single base station, to provide a service to the UE. That is, a plurality of serving cells may be provided for a radio resource control (RCC)-connected UE. When the ideal backhaul is constructed between the node of the macro cell and the RRH, both the macro cell and the RRH cell may be provided as serving cells to provide a service to the UE.

That is, when the CA technology based on a single base station is formed, the UE may have a single RRC connection with the network.

In RRC connection establishment, reestablishment, and handover, a single serving cell provides non-access stratum (NAS) mobility information (e.g. tracking area identity (TAI)). In RRC connection reestablishment and handover, a single cell provides a security input. This cell is referred to as the primary cell (Pcell). Depending on UE capabilities, a secondary cell (Scell) may form the serving cell together with the Pcell.

The present disclosure relates to a method and apparatus for operating UE and a method and apparatus for enabling a base station to use the same method. When a small cell and at least one of a cell, a base station, an RRH, an antenna, and an RU support different duplexes, i.e. FDD and TDD, in a multi-cell structure, the UE belonging to the relevant base station is enabled to support a joint operation between TDD and TDD. In addition, the present disclosure relates to a method of designating a secondary cell in the case in which respective duplex modes are used in a macro cell, a small cell, and at least one of a cell, a base station, an RRH, an antenna, and an RU while supporting the carrier aggregation (CA) and joint operation between the macro cell and the small cell and dual connectivity, regardless of the duplex modes.

Hereinafter, a small cell deployment scenario to which proposals of the present disclosure are applicable will be described.

FIG. 1 is a diagram illustrating a small cell deployment according to an embodiment.

FIG. 1 illustrates network environment where small cells and macro cells coexist. This network environment will be divided more specifically in FIG. 2 and FIG. 3 below, depending on whether or not a macro coverage area is present, whether or not a relevant small cell is intended to be situated outdoors or indoors, whether or not the deployment of the relevant small cell is sparse or dense, and whether or not the same frequency spectrum as that of the macro coverage area is used, in terms of spectrum. Detailed scenario configurations will be described with reference to FIG. 2 to FIG. 6.

Figure 2:
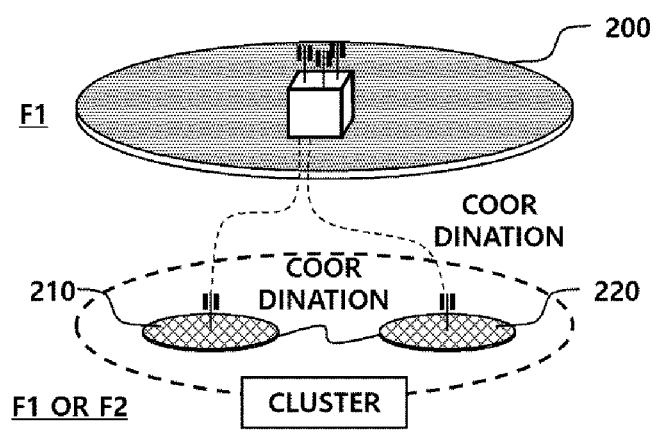
FIG. 2 is a diagram illustrating small cell deployment scenarios.

FIG. 2 is a diagram illustrating small cell deployment scenarios. FIG. 2 represents a general representative configuration of scenarios illustrated in FIG. 3 to FIG. 6. FIG. 2 illustrates the small cell deployment scenario including scenarios #1, #2a, #2b, and #3. A reference numeral 200 indicates a macro cell, and reference numerals 210 and 220 indicate small cells. In FIG. 2, an overlaid cell may be present or absent. Coordination may be performed between the macro cell and the small cells 210 and 220, and coor- dination may be performed between the small cells 210 and 220. Overlaid areas of 200, 210, and 220 may be bound as clusters.

FIG. 3 to FIG. 6 are views illustrating specific scenarios in a small cell deployment.

Figure 3:
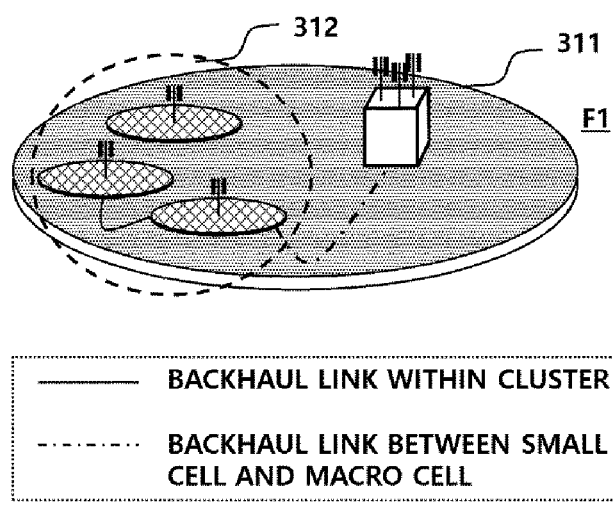
FIG. 3 to FIG. 6 are views illustrating specific scenarios in a small cell deployment.

FIG. 3 illustrates a scenario #1 (small cell deployment scenario #1) in the small cell deployment. Such a scenario #1 is a co-channel deployment scenario of small cells and a macro cell when an overhead macro is present, and is an outdoor small cell scenario. A reference numeral 310 indicates a case in which both a macro cell 311 and small cells are outdoor cells, and a reference numeral 312 indicates a small cell cluster. All users are distributed indoors and outdoors.

A solid line connecting the small cells in the small cell cluster 312 indicates a backhaul link within the cluster. A dot-dash line connecting a base station of the macro cell and a small cell among the small cells within the cluster indicates a backhaul link between the small cell and the macro cell.

Figure 4:
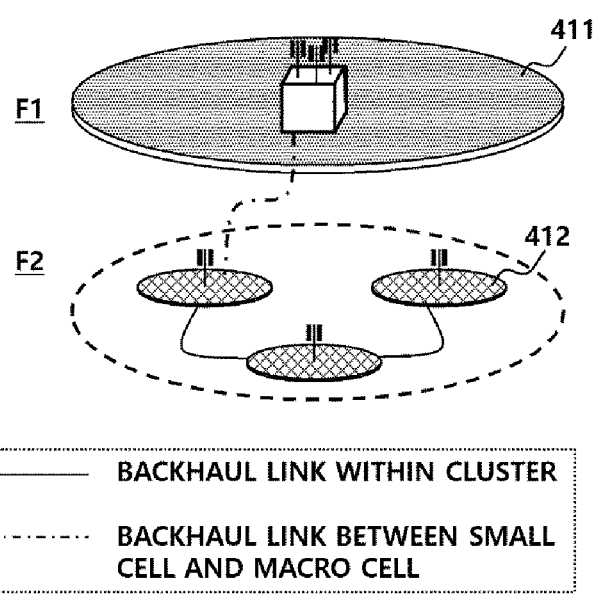

FIG. 4 illustrates a small cell deployment scenario #2a. Such a scenario #2a is a deployment scenario in which small cells and a macro cell use different frequency spectra in the presence of an overlaid macro cell, and it is an outdoor small cell scenario. All of the macro cell 411 and the small cells are situated outdoors, and a reference numeral 412 indicates a small cell cluster. All users are distributed indoors and outdoors.

Solid lines connecting the small cells within the small cell cluster 412 indicate backhaul links within the cluster. A dot-dash line connecting a base station of the macro cell and a small cell among the small cells within the cluster indicates a backhaul link between the small cell and the macro cell.

Figure 5:
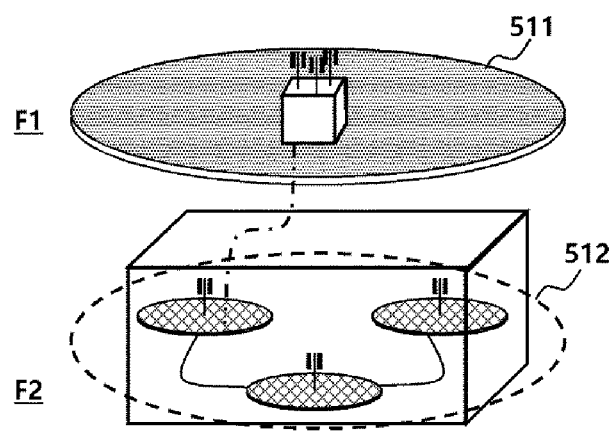

FIG. 5 illustrates a small cell deployment scenario #2b. Such a scenario #2b is a deployment scenario in which small cells and a macro cell use different frequency spectra in the presence of an overlaid macro cell, and it is an indoor small cell scenario. The macro cell 511 is situated outdoors, the entire small cells are situated indoors, and a reference numeral 512 indicates a small cell cluster. All users are distributed indoors and outdoors.

Solid lines connecting the small cells within the small cell cluster 512 indicate backhaul links within the cluster. A dot-dash line connecting a base station of the macro cell and a small cell among the small cells within the cluster indicates a backhaul link between the small cell and the macro cell.

Figure 6:
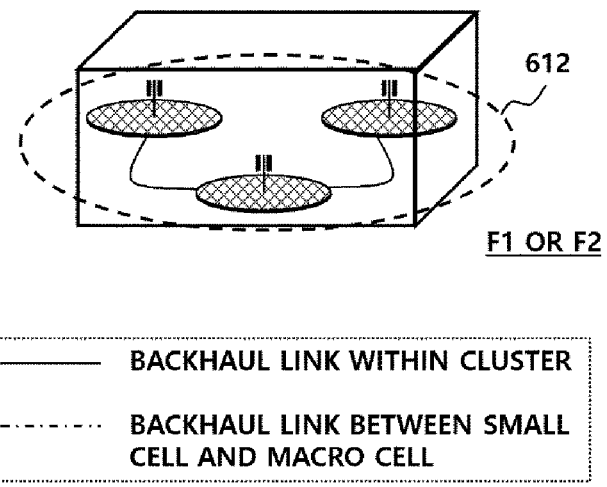

FIG. 6 illustrates a small cell deployment scenario #3. Such a scenario #3 is an indoor small cell scenario in the case in which there is no macro coverage area. A reference numeral 612 indicates a small cell cluster. All small cells are situated indoors, and all users are distributed indoors and outdoors.

Solid lines connecting the small cells within the small cell cluster 612 indicate backhaul links within the cluster. Dot-dash lines connecting a base station of a macro cell and the small cells within the cluster indicate backhaul links between the small cells and the macro cell.

Frequencies F1 and F2 used in FIG. 1 and in the variety of small cell scenarios of FIG. 2 to FIG. 6 as described above may be frequencies supporting the same duplex mode or may have different duplex modes. For example, the frequency F1 may be a frequency supporting an FDD mode, and the frequency F2 may be a frequency supporting a TDD mode, and vice versa.

Figure 7:
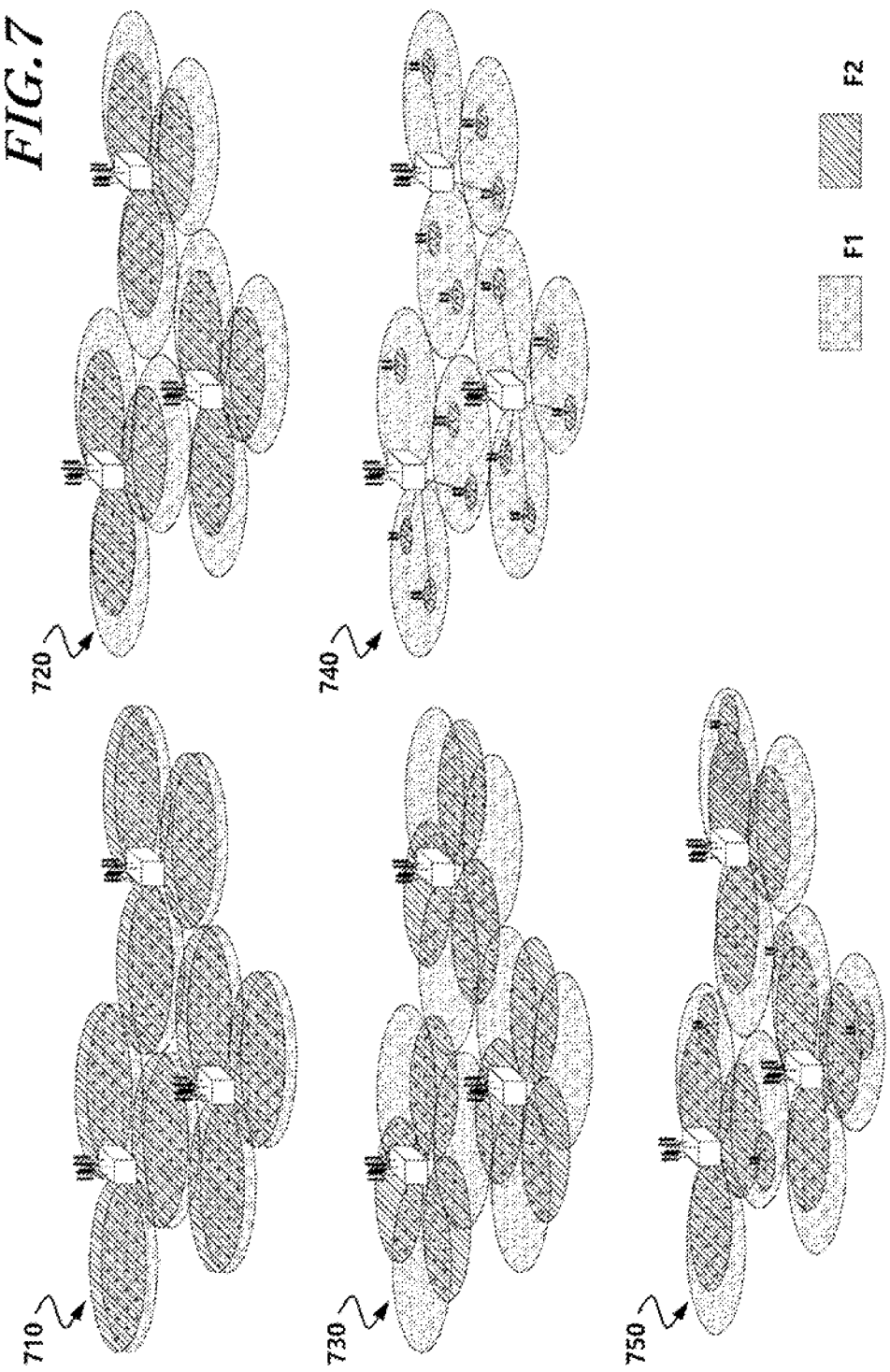
FIG. 7 is a diagram illustrating a variety of scenarios in carrier aggregation (CA).

FIG. 7 is a diagram illustrating a variety of scenarios in carrier aggregation (CA).

In the CA illustrated in FIG. 7, F1 and F2 may be considered to be frequencies supporting the same duplex mode or frequencies supporting different duplex modes.

In a scenario 710, F1 and F2 cells are overlaid while being co-located in substantially the same coverage areas. Two layers are scenarios that provide sufficient coverage areas and mobility, and cell aggregation between overlaid F1 and F2 cells is possible.

A reference numeral 720 indicates a scenario in which F1 and F2 cells are co-located and overlaid and in which each coverage area of F2 is smaller than the relevant coverage area of F1. F1 has sufficient coverage areas, and mobility support is performed based on the coverage areas of F1. F2 is a scenario used to improve throughput. In this scenario, cell aggregation between overlaid F1 and F2 cells is possible.

A reference numeral 730 indicates a scenario in which F1 and F2 cells are co-located but F2 antennas are directed to cell boundaries in order to improve cell edge throughputs. In this scenario, mobility support is performed based on the coverage areas of F1. Although F1 has sufficient coverage areas, F2 has temporary coverage holes. In the same eNB, the F1 and F2 cells can be aggregated in the overlaid coverage areas.

A reference numeral 740 indicates a scenario in which F1 has macro coverage areas and RRHs are used in F2 in order to improve throughputs in hot spots. Mobility support is performed based on the coverage areas of F1. The cells of the RRHs of F2 can be aggregated with F1 macro cells.

A reference numeral 750 indicates a scenario in which each of frequency selective repeaters is deployed in order to expand the coverage area of a single carrier, like the scenario of 720. In this scenario, the F1 and F2 cells in the same eNB can be aggregated in the overlaid coverage areas.

In the specification when UE forms a dual link, a master base station or a first base station may be a base station that forms an RRC connection with the UE and provides a reference cell (e.g. a Pcell) for handover or a base station that terminates an Si-mobility management entity (S1-MME) and serves as a mobility anchor for a core network.

The master base station or the first base station may be a base station that provides a macro cell. Or, in a dual connection between small cells, the mater base station may be a base station that provides any one of the small cells.

In the meantime, in the dual connection environment, a secondary base station or a second base station may be a base station that provides additional wireless resources to the UE and is distinguished from the master base station.

Each of the first base station (e.g., master base station) and the second base station (e.g., secondary base station) can provide at least one cell to the UE, and the first base station and the second base station can be connected to each other through an interface therebetween.

In addition, for a better understanding, a cell related to the first base station may be described as a macro cell, and a cell related to the second base station may be described as a small cell. Alternatively, in a small cell cluster scenario to be described hereinafter, a cell related to the first base station may be described as a small cell.

In the present disclosure, the macro cell may denote a cell or each of at least two cells. The macro cell may represent entire cells related to the first base station. In addition, the small cell may denote a cell or each of at least two cells. The small cell may represent entire cells related to the second base station. Alternatively, the small cell may be a cell related to the first base station in a specific scenario, as of a small cell cluster as described above. In this case, a cell of the second base station may be described as being an additional small cell or a further small cell.

In the following description of embodiments, for the sake of explanation, the macro cell may denote the master base station or the first base station, and the small cell may denote the secondary base station or the second base station. However, the present disclosure is not limited thereto For example, the present disclosure may be applied to where the secondary base station or the second base station denotes the macro cell and the master base station or the first base station denotes the small cell.

When CA is supported, CA in a FDD duplex mode and a TDD duplex mode may be considered. When CA in the FDD mode or in the TDD mode is considered, it may be set to distinguish component carriers (CCs) as below.

First, a primary cell (Pcell) will be described.

When CA is formed, the UE has a single RRC connection with a network. In the case of RRC connection establishment, reestablishment, and handover, a single serving cell provides NAS mobility information. In the case of RRC connection reestablishment and handover, a single serving cell provides a security input. This cell is referred to as the primary cell. In a downlink, a carrier corresponding to the Pcell is a downlink primary component carrier (DL PCC). In an uplink, the carrier corresponding to the Pcell is an uplink primary component carrier (UL PCC).

The Pcell can only be changed by a handover procedure, and the Pcell is used for the transmission of a PUCCH. In addition, the Pcell cannot be de-activated unlike a Scell. The reestablishment is triggered when the Pcell experiences a radio link failure (RLF) but is not triggered when the Scell experiences the RLF. In addition, NAS information is obtained from the Pcell.

Hereinafter, secondary cells (Scells) will be described.

The Scells may form a set of serving cells together with the Pcell, in dependence on UE capability. A carrier corresponding to a Scell in a downlink is a downlink secondary component carrier (DL SCC), and a carrier corresponding to a Scell in an uplink is an uplink secondary component carrier (UL SCC).

Three serving cells among the set of serving cells formed for a UE constantly include a single Pcell and one or more Scells. The number of serving cells depends on the aggregation capability of the UE.

Reestablishment (reconfiguration) and the addition and removal of Scells may be enabled through the RRC. The Scells may be reestablished, added, or removed through the RRC in order to be used together with a target Pcell during intra-LTE handover. When a new Scell is added, dedicated RRC signaling is used in order to transmit the entire system information of the Scell as requested. In a connected mode, the UE is not required to directly obtain broadcast system information from the Scells.

FIG. 8 is a table illustrating a TDD UL-DL configuration in a TDD frame structure. In the table of FIG. 8, a reference alphabet D indicates DL subframes, a reference alphabet U indicates UL subframes, and a reference alphabet S indicates special subframes.

FIG. 9 is a table illustrating downlink associations for TDD DL HARQ-ACK transmissions in the TDD UL-DL configuration illustrated in FIG. 8. FIG. 9 relates to DL HARQ-ACK timing for TDD and indicates the connection relationship of a $(n-k)^{th}$ DL PDSCH for HARQ-ACK transmissions enabled by a subframe n. Values represented in FIG. 9 indicate sets of values that k may have.

FIG. 10 is a table illustrating reference TDD UL-DL configurations.

FIG. 10 illustrates a TDD DL reference TDD UL-DL configuration set for DL scheduling and DL HARQ-ACK timing used in a TDD mode according to different TDD UL-DL configurations established for a Pcell and a Scell among different TDD UL-DL configurations during interband TDD carrier aggregation (CA).

In the related art, CA in each of a FDD duplex mode and a TDD duplex mode was considered. However, the realization of the aggregation and the joint operation between carriers having different duplex modes, such as a FDD duplex mode and a TDD duplex mode, as proposed in the present disclosure, has not been considered in the related art.

Therefore, the present disclosure proposes operating methods in UE and a base station regarding DL HARQ-ACK timing when the joint operation and the CA of different duplex modes, such as a FDD duplex mode and a TDD duplex mode, are considered. The operation in the base station may be a method of, at the base station, establishing the operation of the UE.

When the base station considers joint operations and carrier aggregation (CA) of different FDD and TDD duplex modes on the UE, a configuration depending on DL HARQ-ACK timing in the UE, a method of operating the UE, and an operation in the base station are required to be defined differently from those in the case of performing the CA in existing duplex modes. Accordingly, the present disclosure proposes a method of operating the UE, a method of, at the base station, establishing the operation of the UE, as well as a UE system and a base station system related thereto in such a case.

First, the present disclosure proposes a method of DL HARQ-ACK timing that may vary depending on the duplex modes of cells designated as a Pcell and a Scell during the TDD-FDD joint operation.

A UE procedure for DL HARQ-ACK timing during the TDD-FDD joint operation will be described below.

a) A case in which TDD is applied to a Pcell and FDD is applied to a Scell will be described.

While a TDD UL subframe designated as the TDD Pcell is present in a specific subframe according to the TDD UL-DL configuration, $(k+4)^{th}$ DL HARQ-ACK timing transmitted under the grant of the existing $k^{th}$ subframe is used for DL HARQ-ACK timing regarding the FDD Scell. Thus, when the TDD Pcell UL is designated, an HARQ-ACK and a PUCCH for a PDSCH to be transmitted to the FDD Scell cannot be transmitted unless the $(k+4)^{th}$ timing is established as a UL subframe in the relevant TDD Pcell. Consequently, UE able to perform the TDD-FDD joint operation requires a method of improving the DL HARQ-ACK timing regarding the relevant FDD S cell.

A method a-1 may be considered as a method of applying DL HARQ-ACK timing regarding the FDD Scell as DL HARQ-ACK timing to be used by the TDD Pcell when the UE that has established the TDD Pcell adds the FDD Scell for the TDD-FDD joint operation and CA. That is, in this method, the TDD DL HARQ-ACK timing connected to the establishment of the TDD UL-DL subframes used by the TDD Pcell is applied to the FDD Scell, regardless of whether the relevant HARQ-ACK is established to be transmitted to the $(k+4)^{th}$ UL regarding the PDSCH granted by the $k^{th}$ subframe established for the existing FDD-FDD CA of the FDD Scell. This method is applied as if the TDD Scell is added to the FDD Scell.

In this manner, the method of applying the DL HARQ-ACK timing of the TDD Pcell may be additionally expressed in two ways. As one way, a method of establishing the DL HARQ-ACK timing of the FDD Scell depending on a reference configuration used in the TDD Pcell may be considered. As the other way, a method of establishing a TDD UL-DL configuration having the smallest UL subframe under a standard having the same switch-point periodicity among TDD UL-DL configurations considered as the TDD Pcell and establishing DL HARQ-ACK timing regarding the FDD Scell may be considered. Here, when establishing the standard based on switch-point periodicity, TDD UL-DL configuration 5 may be considered so as to be established independently.

For example, according to an embodiment related to the switch-point periodicity, for TDD UL-DL configurations 0, 1, 2, and 6 in which the same switch-point periodicity is 5 ms, TDD UL-DL configuration 2, having the smallest number of UL subframes, may be established as a reference configuration. For TDD UL-DL configurations 3 and 4 in which the same switch-point periodicity is 10 ms, TDD UL-DL configuration 4, having the smallest number of UL subframes, may be established as a reference configuration. In addition, for TDD UL-DL configurations 3, 4, and 5 in which the same switch-point periodicity is 10 ms, TDD UL-DL configuration 5 having the smallest number of UL subframes may be established as a reference configuration. Alternatively, in the case of establishment according to the standard, TDD UL-DL configuration 5, having the smallest number of UL subframes, i.e. a single subframe, may be established as a reference configuration.

When this method is applied, it is possible to prevent the case in which neither the HARQ-ACK or the PUCCH can be transmitted since the $(k+4)^{th}$ UL subframe of the TDD Pcell is absent under the grant of the $k^{th}$ subframe regarding the FDD Scell, as mentioned in the Technical Problem section of the present disclosure.

In a method a-2, in a specific TDD UL-DL configuration established for a specific TDD Pcell, when an HARQ-ACK is transmitted in response to a DL transmitted from an FDD Scell at DL HARQ-ACK timing according to the TDD UL-DL configuration established for the TDD Pcell, there is no DL HARQ-ACK information regarding an FDD Scell DL subframe aligned with the UL subframe of the TDD Pcell. It is because the relevant subframe in the existing TDD Pcell was a UL subframe. That is, regarding a DL PDSCH transmitted to an FDD Scell DL subframe index having a subframe index the same as a UL subframe index of the TDD Pcell, the timing of a UL subframe on which the HARQ-ACK is to be transmitted is not present, whereby it is impossible to transmit DL data on a DL subframe in the FDD Scell. This can reduce the DL data transfer rate of the FDD Scell by about 10% to about 60%, depending on the TDD UL-DL configuration established for each TDD Pcell. Thus, in order to overcome this problem, the present disclosure defines the HARQ-ACK timing of an additional DL regarding the DL of the relevant FDD Scell. Basically, the DL HARQ-ACK timing of the DL subframe of the FDD Scell to the TDD Pcell is established to have DL HARQ-ACK timing in the TDD Pcell regarding the FDD Scell, causing the HARQ-ACK to be transmitted on a minimum $n^{th}$ subframe even if the transmission of the HARQ-ACK is the fastest, regarding the transmission of a PDSCH indicated by PDCCH/EPDCCH detection for a DL SPS release in the $(n-4)^{th}$ subframe or indicated by the detection of the relevant PDCCH.

A method a-2 may include two methods as follows. In the first method, the DL HARQ-ACK timing of the FDD Scell is established according to a TDD UL-DL reference configuration used in the TDD Pcell. That is, there is no timing present for a UL subframe for transmitting HARQ-ACK regarding the DL PDSCH transmitted to the FDD Scell DL subframe index, the subframe index of which is the same as a reference UL subframe index used in the TDD Pcell. Thus, it cannot perform the transmission of the DL subframe in the FDD Scell. Accordingly, a method may be provided for defining the DL HARQ-ACK timing of the additional FDD Scell, as illustrated in the following drawings.

In the second method, a TDD UL-DL configuration having a smallest UL subframe is select among TDD UL-DL configurations considered for the TDD Pcell based on the same switch-point periodicity as a standard. The selected TDD UL-DL configuration is set as a reference configuration. Regarding the DL PDSCH transmitted to the FDD Scell DL subframe index having the same subframe index as the UL subframe index of the relevant reference configuration, there is no the timing of the UL subframe for transmitting the HARQ-ACK. Accordingly, it cannot perform the transmission of the DL subframe in the FDD Scell. For this, a method may be provided for defining the DL HARQ-ACK timing of the additional FDD Scell in the accompanying drawings. When the standard is established based on switch-point periodicity, a TDD UL-DL configuration 5 may be established independently. For example, according to an embodiment, for TDD UL-DL configurations 0, 1, 2, and 6, in which the same switch-point periodicity is 5 ms, a TDD UL-DL configuration 2 has the smallest number of UL subframes and may be set as a reference configuration. For TDD UL-DL configurations 3 and 4 having the same switch-point periodicity of about 10 ms, a TDD UL-DL configuration 4 has the smallest number of UL subframes and may be established as a reference configuration. Among TDD UL-DL configuration 3, 4, and 5 having the same switch-point periodicity of about 10 ms, a TDD UL-DL configuration 5 has the smallest number of UL subframes and may be established as a reference configuration. When setting is performed based on a standard, a TDD UL-DL configuration 5 may be set as a reference configuration for the TDD UL-DL configuration 5 having the smallest number of UL subframes.

The method a-2-1 include a detailed method. Such a detailed method is a method of adding a value relevant to TDD UL-DL subframe switch periodicity to each of the TDD UL-DL configurations of DL association sets.

In the following embodiment, a DL HARQ-ACK timing relationship is defined for transmitting HARQ-ACK of DL on a TDD Pcell in response to an FDD Scell according to each UL-DL subframe configuration of a TDD Pcell. That is, as illustrated in FIG. 11, it proposes the DL HARQ-ACK timing relationship of the FDD Scell to the TDD Pcell when TDD is applied to the Pcell and FDD is applied to the Scell in the TDD-FDD joint operation and CA.

FIG. 11 is a table illustrating a timing relationship in a method a-2-1) according to an embodiment of the present disclosure. FIG. 11 proposes a DL association set index K: $\{k_0, k_1, \ldots, k_{M-1}\}$ for the TDD-FDD joint operation and CA.

FIG. 11 represents DL association sets for the TDD-FDD joint operation by adding timing for an FDD Scell thereto, when compared with the DL association sets illustrated in FIG. 9. The portions highlighted (underlined and in bold) in FIG. 11 indicate timing for the FDD Scell added according to the present disclosure.

TDD DL HARQ-ACK timing data regarding the FDD Scell according to the respective TDD UL-DL configurations in FIG. 11 may be independent of each other. In the specification, relationships regarding seven sets are represented in a single table as in FIG. 11 instead of being represented in respective tables.

This example represents a scheme of a method a-2-1) above, enabling the HARQ-ACK regarding the FDD Scell to be transmitted by being equally or equivalently distributed on TDD UL subframes, regarding the portions of the TDD UL subframes in which the additional DL HARQ-ACK timing transmitted on the FDD Scell is required to be defined.

As the characteristics of the timing for the FDD Scell added in FIG. 11, when the interval of switch-point periodicity in the DL association sets according to the UL subframes established for the TDD Pcell is K, it is HARQ-ACK timing in which K is added to the DL association sets according to the UL subframes. That is, since K is 5 in embodiments (UL-DL configurations 0, 1, and 2) in which the switch-point periodicity is 5, "5 (FDD Scell)" is added to each of the UL subframes. Next, since K is 10 in embodiments (UL-DL configurations 3, 4, 5, and 6) in which the switch-point periodicity is 10, "10 (FDD Scell)" is added to each of the UL subframes.

In other additional embodiments, a method of establishing DL HARQ-ACK timing for the FDD Scell such that the HARQ-ACK in response to the relevant FDD Scell is allocated to a specific TDD UL subframe may be considered.

FIG. 12 and FIG. 13 are tables illustrating embodying a TDD UL-DL configuration 4 as a Pcell based on a method a-2-1) according to an embodiment of the present disclosure. Both FIG. 12 and FIG. 13 represent a DL association set index K: $\{k_0, k_1, \ldots, k_{M-1}\}$ for a TDD-FDD joint operation. FIG. 12 illustrates a method a-2-1-a, and FIG. 13 illustrates a method a-2-1-b. A method may be considered for setting a DL HARQ-ACK timing to allocate a HARQ-ACK for DL PDSCH of a FEE Scell corresponding to a specific TDD subframe like the TDD UL-DL configuration 4 embodied as a Pcell. Although a TDD UL-DL configuration 4 is represented by way of example in FIG. 12 and FIG. 13, the same principle may be applied to other TDD UL-DL configurations. For example, it is possible to add a method of establishing the DL HARQ-ACK timing of the FDD S cell regarding TDD UL-DL configurations 0, 1, 3, and 6 by applying a principle similar to that of FIG. 12 and FIG. 13 to TDD UL-DL configurations 0, 1, 3, and 6 to be distinguished from TDD UL-DL configurations 0, 1, 3, and 6 proposed in FIG. 11.

As shown in FIG. 12 or FIG. 13, it may apply a HARQ-ACK timing added to a single UL subframe within the UL-DL subframe switch-point periodicity which is set in the TDD Pcell as a HARQ-ACK timing for the DL signal. As shown in FIG. 12, "10 and 9 (FDD Scell)" is added to the second subframe.

Likewise, when the interval of switch-point periodicity is 5 subframes, HARQ-ACK timing added to a single UL subframe (e.g. subframe 3) within the switch-point periodicity may be applied.

The Method a-2-2) includes a detailed method 2. The detailed method 2 is a method of adding a TDD DL HARQ-ACK timing to a TDD UL-DL configuration of each DL association set in order to allocate an earlier-transmitted FDD Scell DL to an earlier UL subframe from the time domain regardless of the TDD UL-DL subframe switch periodicity.

FIG. 14 is a table illustrating a timing relationship in a method a-2-2) according to an embodiment of the present disclosure. FIG. 14 represents a DL association set index K: $\{k_0, k_1, \ldots, k_{M-1}\}$ for a TDD-FDD joint operation and CA.

FIG. 14 shows DL association sets for the TDD-FDD joint operation by adding a timing for an FDD Scell as compared with the DL association sets illustrated in FIG. 9. The portions highlighted (underlined and in bold) in FIG. 14 indicate the added timing for the FDD Scell according to the present disclosure.

TDD DL HARQ-ACK timing data regarding the FDD Scell according to the respective TDD UL-DL configurations in FIG. 14 may be independent of each other. In the specification, relationships regarding seven sets are represented in a single table as in FIG. 14 instead of being represented in respective tables.

This example represents a scheme by which the HARQ-ACK in response to the FDD Scell can be equally or equivalently distributed and can be transmitted to TDD UL subframes, regarding the portions of the TDD UL subframes in which the additional DL HARQ-ACK timing transmitted from the FDD Scell is required to be defined in Method a-2-2) above.

Referring to FIG. 14, the UE may apply added HARQ-ACK timing to the UL subframe-specific DL association sets of the TDD Pcell according to the sequence of the DL subframe, in which the DL signal is transmitted, as HARQ-ACK timing regarding the DL signal. For example, in FIG. 14, in the case of a TDD UL-DL configuration 0, "5 (FDD Scell)" is added to each of UL subframes 2, 3, 4, 7, 8, and 9. This is an example in which the HARQ-ACK timing is applied according to the sequence in which DL signal is transmitted.

As described in a method a-2-1), in a Method a-2-2), a similar method of establishing DL HARQ-ACK timing regarding the FDD Scell such that HARQ-ACK timing regarding the relevant S cell is allocated to a specific TDD UL subframe may be considered as another additional embodiment.

FIG. 15 and FIG. 16 are tables illustrating embodying a TDD UL-DL configuration 4 in Method a-2-2) as a Pcell according to an embodiment of the present disclosure. Both FIG. 15 and FIG. 16 represent a DL association set index K: $\{k_0, k_1, \ldots, k_{M-1}\}$ for a TDD-FDD joint operation. FIG. 15 illustrates a method a-2-2-$a$, and FIG. 16 illustrates a method a-2-2-$b$. As embodying the TDD UL-DL configuration 4 as the Pcell, a method may be considered for establishing DL HARQ-ACK timing in order to allocate an HARQ-ACK in response to the DL PDSCH of the above-mentioned FDD S cell to a specific TDD subframe. Although the TDD UL-DL configuration 4 is represented by way of example in FIG. 15 and FIG. 16, the same principle may be applied to other TDD UL-DL configurations 0, 1, 3, and 6.

The embodiments applicable when the TDD is applied to the Pcell and FDD is applied to the Scell have been described in a) above. Next, reference will be made to the opposite case.

b) A case in which the FDD is applied to a Pcell and TDD is applied to an Scell will be described as follows:

Although an operation may be performed such that an HARQ-ACK is transmitted to an FDD Pcell UL designated as an FDD Pcell through a PUCCH at DL HARQ-ACK timing regarding a TDD Scell, when the HARQ-ACK is transmitted at the DL HARQ-ACK timing of TDD established as the TDD Scell, the transmission of the DL HARQ-ACK for a specific TDD DL may be concentrated in a specific FDD Pcell UL, thereby overloading a specific Pcell UL subframe. Alternatively, the transmission rate of the HARQ-ACK to the relevant Pcell UL subframe may be reduced by DL traffics transmitted to the TDD S cell, caused by errors that may occur due to the degrading channel environment. Thus, for a UE allowing the TDD-FDD joint operation, a method of improving DL HARQ-ACK timing regarding the relevant TDD Scell is required.

A method b-1 will be described with respect detailed embodiments.

Method b-1) When a UE established an FDD Pcell adds an Scell for the TDD-FDD joint operation and CA of a TDD Scell, a method may be considered for applying HARQ-ACK timing used by the FDD Pcell as DL HARQ-ACK timing regarding the TDD Scell. That is, this Method applies the DL HARQ-ACK timing used by the FDD Pcell to the TDD Scell regardless of the TDD DL HARQ-ACK timing connected to the establishment of TDD UL-DL subframes of the TDD Scell. The DL HARQ-ACK timing used in the FDD is established such that a corresponding HARQ-ACK is transmitted to the $(k+1)^{th}$ UL regarding a PDSCH granted by the $k^{th}$ subframe. This is applied as if the FDD Scell is added to the TDD Scell. The application of the relevant method can prevent the problem as mentioned above in the present disclosure in which the performance of the system significantly depends on, for example, the probability of the detection of the PUCCH transmitted to a specific subframe as the HARQ-ACK and the PUCCH are concentrated in a specific UL subframe.

In addition, a scenario to which the present disclosure is applied is a scenario used in the TDD-FDD joint operation. This scenario is applicable to both of a case in which CA can be used in a UL through two or more component carriers and a case in which CA cannot be used in the UL, i.e. a single component carrier is used.

When performing CA using carriers having different TDD and FDD duplex modes, the vagueness between the UE and the base station regarding the operation of the UE based on the Pcell/Scell establishment between the UE and the base station and regarding the establishment of the base station is removed. This can obtain accuracy in an access procedure, UL-DL data transmissions, and transmission and reception operations through UL-DL control channels including an HARQ operation performed between the UE and the base station, thereby achieving the reliability of data transmissions between the UE and the base station. This can also increase UL-DL data transmission rates.

FIG. 17 to FIG. 23 represent exemplary cases in which TDD cells having TDD UL-DL configurations 0 to 6 and an FDD cell are subjected to CA for TDD-FDD joint operations. Hatched DL blocks in the FDD cell indicate that the transmission of HARQ-ACK timing regarding a DL transmission to the relevant FDD cell is additionally required. The relevant HARQ-ACK will be described in detail in the present disclosure.

FIG. 17 is a table illustrating a case in which a TDD Cell having TDD UL-DL configuration 0 and an FDD Cell are subjected to CA according to an embodiment of the present disclosure. That is, FIG. 17 indicates that FDD subframes 2, 3, 4, 7, 8, and 9 additionally require the transmission of HARQ-ACK timing regarding DL transmission to the corresponding FDD cell DL.

FIG. 18 is a table illustrating a case in which a TDD Cell having TDD UL-DL configuration 1 and an FDD Cell are subjected to CA according to an embodiment of the present disclosure. That is, FIG. 18 indicates that FDD subframes 2, 3, 7, and 8 additionally require the transmission of HARQ-ACK timing regarding DL transmission to the relevant FDD cell DL.

FIG. 19 is a table illustrating a case in which a TDD Cell having a TDD UL-DL configuration 2 and an FDD Cell are subjected to CA according to an embodiment of the present disclosure. That is, FIG. 19 indicates that FDD subframes 2 and 7 additionally require the transmission of HARQ-ACK timing regarding DL transmission to the relevant FDD cell DL.

FIG. 20 is a table illustrating a case in which a TDD Cell having TDD UL-DL configuration 3 and an FDD Cell are subjected to CA according to an embodiment of the present disclosure. That is, FIG. 20 indicates that FDD subframes 2, 3, and 4 additionally require the transmission of HARQ-ACK timing regarding DL transmission to the relevant FDD cell DL.

FIG. 21 is a table illustrating a case in which a TDD Cell having TDD UL-DL configuration 4 and an FDD Cell are subjected to CA according to an embodiment of the present disclosure. That is, FIG. 21 indicates that FDD subframes 2 and 3 additionally require the transmission of HARQ-ACK timing regarding DL transmission to the relevant FDD cell DL.

FIG. 22 is a table illustrating a case in which a TDD Cell having TDD UL-DL configuration 5 and an FDD Cell are subjected to CA according to an embodiment of the present disclosure. That is, FIG. 22 indicates that FDD subframe 2 additionally requires the transmission of HARQ-ACK timing regarding DL transmission to the relevant FDD cell DL.

FIG. 23 is a table illustrating a case in which a TDD Cell having TDD UL-DL configuration 6 and an FDD Cell are subjected to CA according to an embodiment of the present disclosure. That is, FIG. 23 indicates that FDD subframes 2, 3, 4, 7, and 8 additionally require the transmission of HARQ-ACK timing regarding DL transmission to the relevant FDD cell DL.

Figure 24:
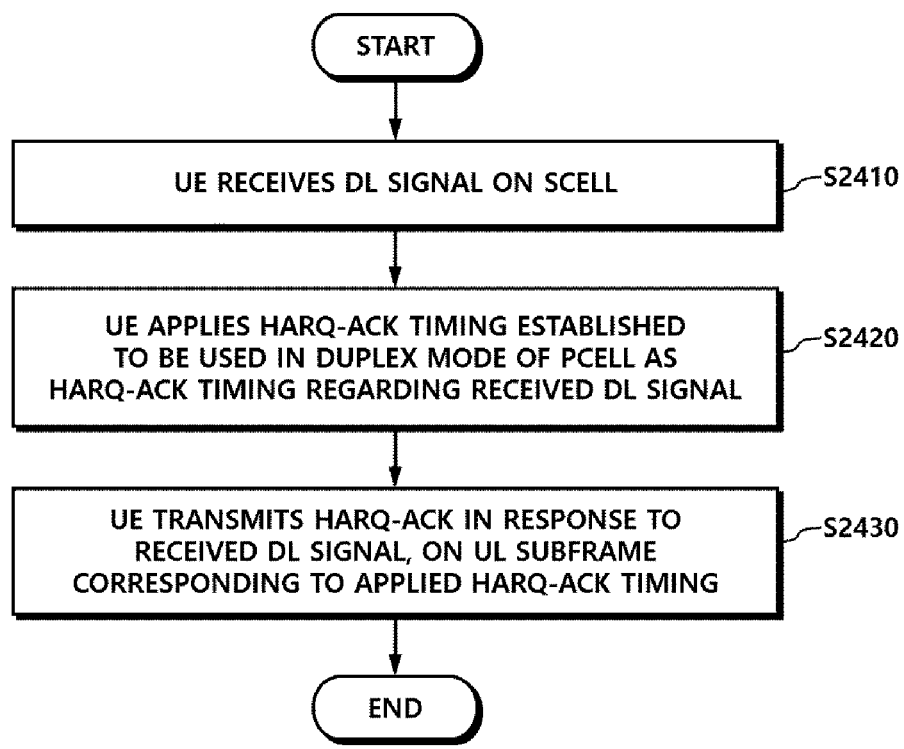
FIG. 24 is a diagram illustrating the operation of user equipment according to an embodiment of the present disclosure.

FIG. 24 is a diagram illustrating an operation of a UE according to an embodiment of the present disclosure.

FIG. 24 illustrates a process of the UE for establishing a DL HARQ-ACK timing in a TDD-FDD joint operation and CA. In S2410, the UE receives a DL signal on a Scell. In S2420, the UE applies a HARQ-ACK timing established to be used in the duplex mode of the Pcell as a HARQ-ACK timing regarding the received DL signal. Afterwards, in S2430, the UE transmits an HARQ-ACK in response to the received DL signal, on a UL subframe corresponding to the applied HARQ-ACK timing.

More specifically, as in the case b) above, when the Pcell is established as an FDD Pcell and the Scell is established as a TDD Scell, the operation S2420 is embodied such that the HARQ-ACK timing established to be used in the FDD Pcell is applied as the HARQ-ACK timing of the Scell. Detailed embodiments thereof have been described in the method b-1 above.

In the meantime, as in the case a) above, when the Pcell is established as a TDD Pcell and the Scell is established as an FDD Scell, the operation S2420 may apply the HARQ-ACK timing established to be used in the TDD Pcell as the HARQ-ACK timing of the Scell. According to an alternative embodiment, when the Pcell is established as a TDD Pcell and the Scell is established as an FDD Scell, the operation S2420 may apply additional HARQ-ACK timing to the HARQ-ACK timing of the Pcell as the HARQ-ACK timing of the Scell.

Embodiments of the case a) may include the method a-1, the method a-2, the method a-2-1, the method a-2-2, and the like as described above.

Figure 25:
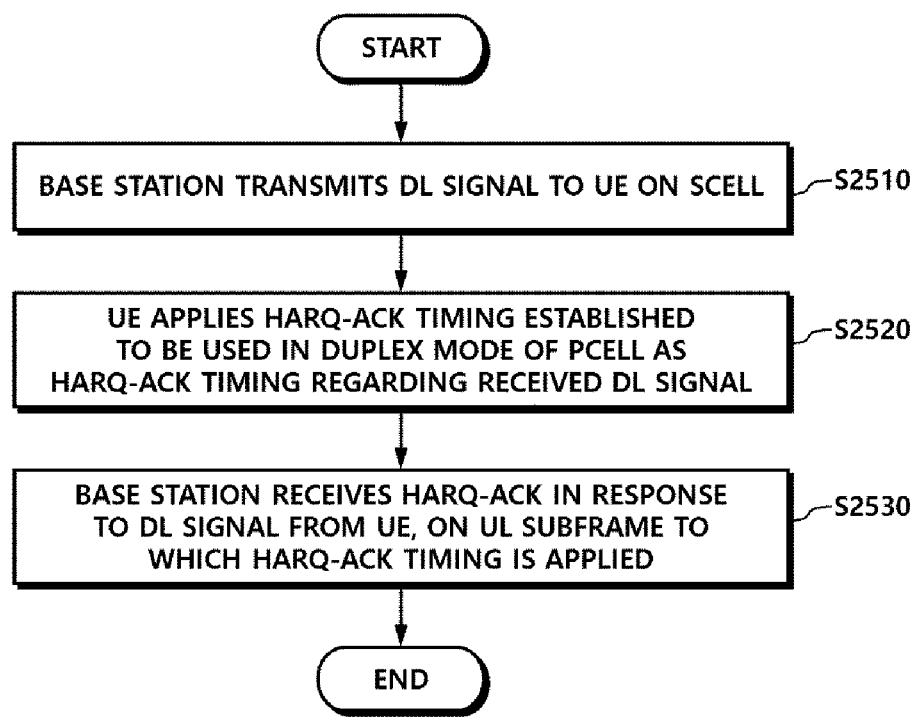
FIG. 25 is a diagram illustrating the operation of a base station according to an embodiment of the present disclosure.

FIG. 25 is a diagram illustrating an operation of a base station according to an embodiment of the present disclosure.

FIG. 25 is a diagram illustrating a process of the base station for establishing a DL HARQ-ACK timing in a TDD-FDD joint operation. In S2510, the base station transmits a DL signal to UE on a Scell. Afterwards, in S2520, the UE applies HARQ-ACK timing established to be used in the duplex mode of a Pcell as HARQ-ACK timing regarding the received DL signal. Subsequently, in S2530, the base station receives an HARQ-ACK in response to the DL signal from the UE, on a UL subframe to which the HARQ-ACK timing applied to be used in the duplex mode of the Pcell is applied.

More specifically, as in the case b) above, when the Pcell is established as an FDD Pcell and the Scell is established as TDD Scell, the UL subframe is embodied as an uplink subframe to which HARQ-ACK timing established to be used in the FDD Pcell is applied as the HARQ-ACK timing of the TDD Scell. Detailed embodiments thereof have been described in the method b-1 above.

In the meantime, as in the case a) above, when the Pcell is established as a TDD Pcell and the S cell is established as an FDD S cell, the UL subframe may be a subframe in which the HARQ-ACK timing established to be used in the TDD Pcell is applied as the HARQ-ACK timing of the S cell. According to an alternative embodiment, when the Pcell is established as a TDD Pcell and the Scell is established as an FDD Scell, the UL subframe may be a UL subframe in which additional HARQ-ACK timing is applied to the HARQ-ACK timing of the TDD Pcell as the HARQ-ACK timing of the FDD Scell.

Embodiments of the case a) may include the method a-1, the method a-2, the method a-2-1, the method a-2-2, and the like as described above.

Figure 26:
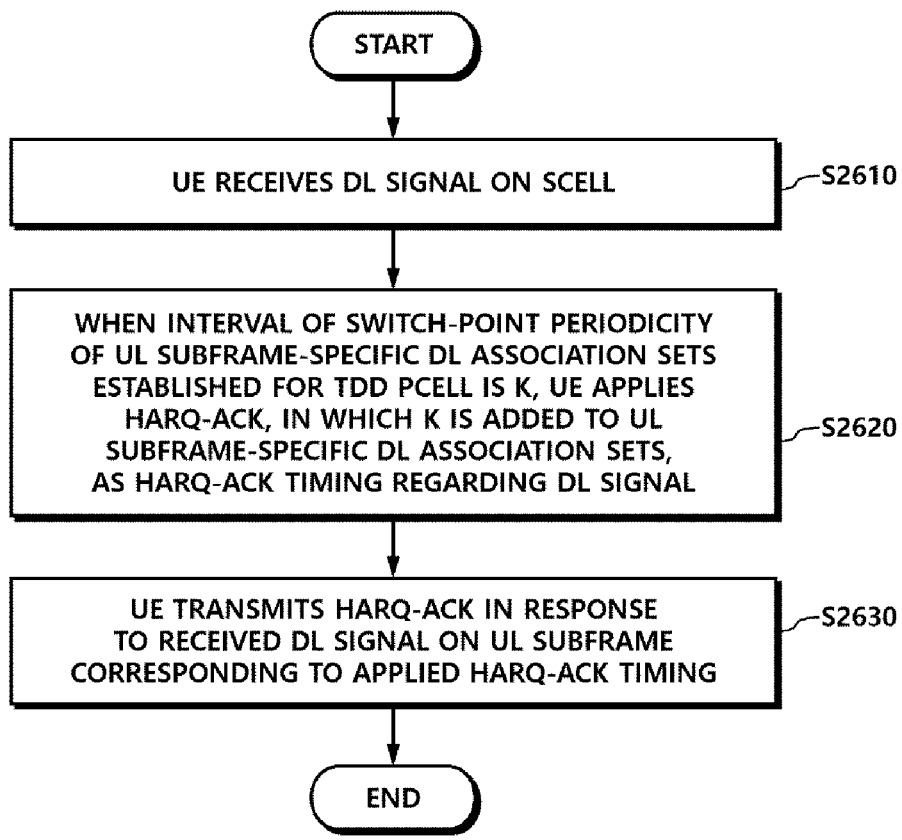
FIG. 26 is a diagram illustrating the operation of user equipment embodying a method a-2-1 (Specific Method 1) according to an embodiment of the present disclosure. [39]

FIG. 26 is a diagram illustrating an operation of a UE for embodying a method a-2-1 (detailed Method 1) according to an embodiment of the present disclosure.

Disclosed is a process of the UE for establishing a DL HARQ-ACK timing in a mobile communications network in which a Pcell is established as a TDD Pcell and a Scell is established as an FDD Scell. In S2610, the UE receives a DL signal on the Scell. In S2620, when the interval of switch-point periodicity of UL subframe-specific DL association sets established for the TDD Pcell is K, the UE applies HARQ-ACK timing, in which K is added to the UL subframe-specific DL association sets, as HARQ-ACK timing regarding the DL signal. Afterwards, in S2630, the UE transmits an HARQ-ACK in response to the received DL signal, on a UL subframe corresponding to the applied HARQ-ACK timing.

Cases in which K is 5 or 10 have been discussed above with reference to FIG. 11, the method a-2-1, and the relevant description.

Figure 27:
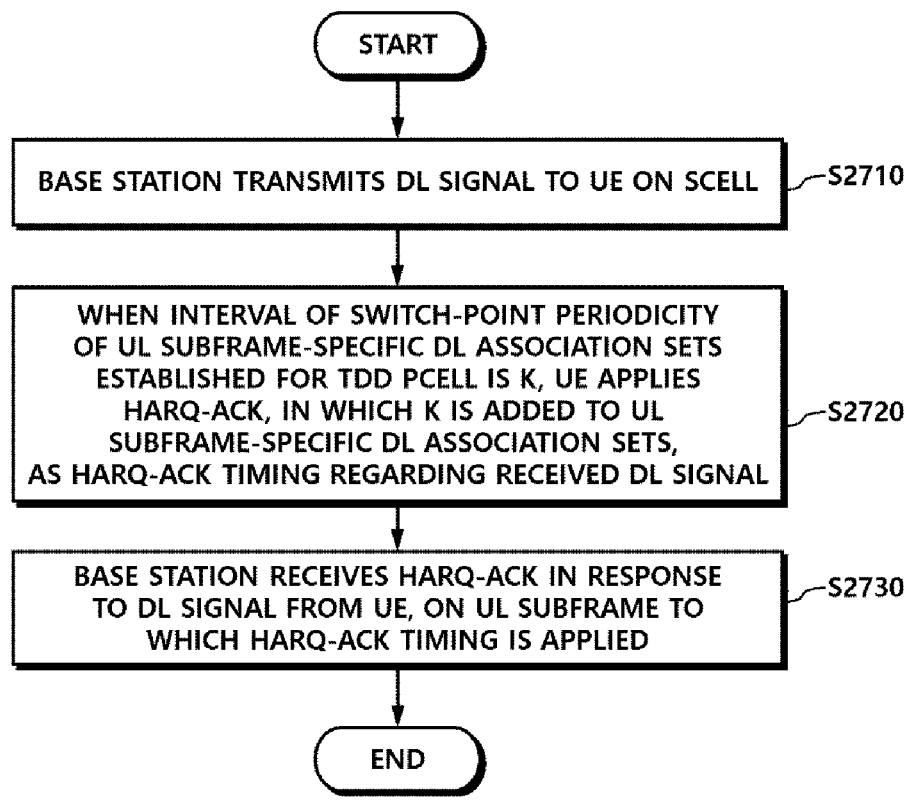
FIG. 27 is a diagram illustrating the operation of a base station embodying a method a-2-1 (Specific Method 1) according to an embodiment of the present disclosure.

FIG. 27 is a diagram illustrating an operation of a base station for embodying a method a-2-1 (detailed Method 1) according to an embodiment of the present disclosure.

FIG. 27 is a diagram illustrating a process of a base station for establishing a DL HARQ-ACK timing in a mobile communications network in which a Pcell is established as a TDD Pcell and a Scell is established as an FDD Scell. In S2710, the base station transmits a DL signal to UE on the Scell. Afterwards, in S2720, when the interval of switch-point periodicity of UL subframe-specific DL association sets established for the TDD Pcell is K, the UE applies HARQ-ACK timing, in which K is added to the UL subframe-specific DL association sets, as HARQ-ACK timing regarding the received DL signal. In S2730, the base station receives an HARQ-ACK in response to the DL signal from the UE, on a UL subframe to which the HARQ-ACK timing is applied.

Cases in which K is 5 or 10 have been discussed above with reference to FIG. 11, the method a-2-1, and the relevant description.

Figure 28:
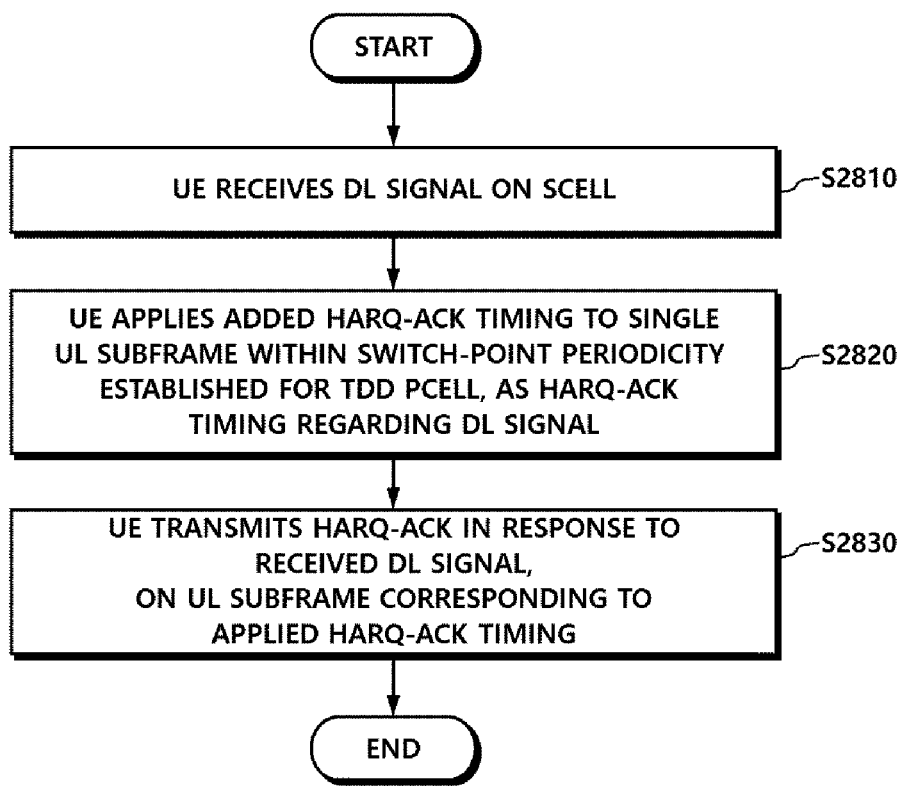
FIG. 28 is a diagram illustrating the operation of user equipment establishing DL HARQ-ACK timing for an FDD Scell on a specific single UL subframe as in FIG. 12 and FIG. 13 according to an embodiment of the present disclosure.

FIG. 28 is a diagram illustrating an operation of a UE for establishing DL HARQ-ACK timing for an FDD Scell on a specific single UL subframe as in FIG. 12 and FIG. 13 according to an embodiment of the present disclosure.

Disclosed is a process of the UE for establishing a DL HARQ-ACK timing in a mobile communications network in which a Pcell is established as a TDD Pcell and a Scell is established as an FDD Scell. In S2810, the UE receives a DL signal on the Scell. In S2820, the UE applies additional HARQ-ACK timing to a single UL subframe within switch-point periodicity established for the TDD Pcell, as DL HARQ-ACK timing regarding the DL signal. Afterwards, in S2830, the UE transmits an HARQ-ACK in response to the received DL signal, on a UL subframe corresponding to the applied HARQ-ACK timing.

The case in which the single UL subframe is subframe 2 when the interval of switch-point periodicity is 10 subframes has been discussed with reference to FIG. 12 and the relevant description.

Figure 29:
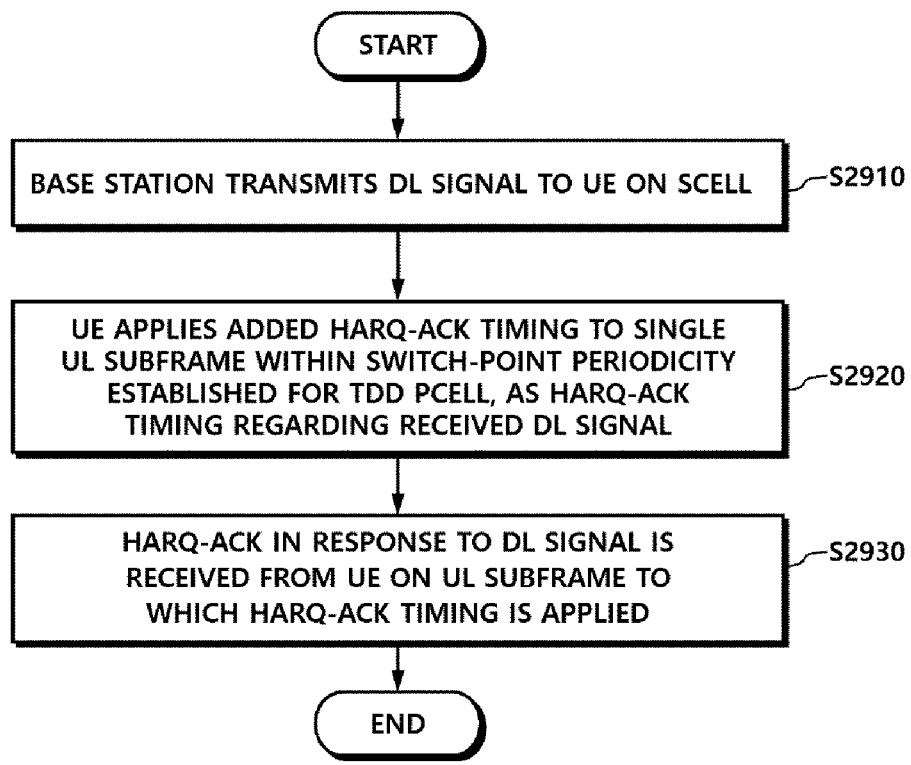
FIG. 29 is a diagram illustrating the operation of a base station establishing DL HARQ-ACK timing for an FDD Scell on a specific single UL subframe as in FIG. 12 and FIG. 12 according to an embodiment of the present disclosure.

FIG. 29 is a diagram illustrating an operation of a base station for establishing a DL HARQ-ACK timing for an FDD S cell on a specific single UL subframe as in FIG. 12 and FIG. 12 according to an embodiment of the present disclosure.

FIG. 29 is a diagram illustrating a process of the base station for establishing a DL HARQ-ACK timing in a mobile communications network in which a Pcell is established as a TDD Pcell and a Scell is established as an FDD Scell. In S2910, the base station transmits a DL signal to UE on the Scell. Afterwards, in S2920, the UE applies additional HARQ-ACK timing to a single UL subframe within switch-point periodicity established in the TDD Pcell, as a HARQ-ACK timing regarding the received DL signal. In addition, in S2930, the base station receives HARQ-ACK in response to the DL signal from the UE, on the UL subframe to which the HARQ-ACK timing is applied.

The case in which the single UL subframe is subframe 2 when the interval of switch-point periodicity is 10 subframes has been discussed with reference to FIG. 12 and the relevant description.

Figure 30:
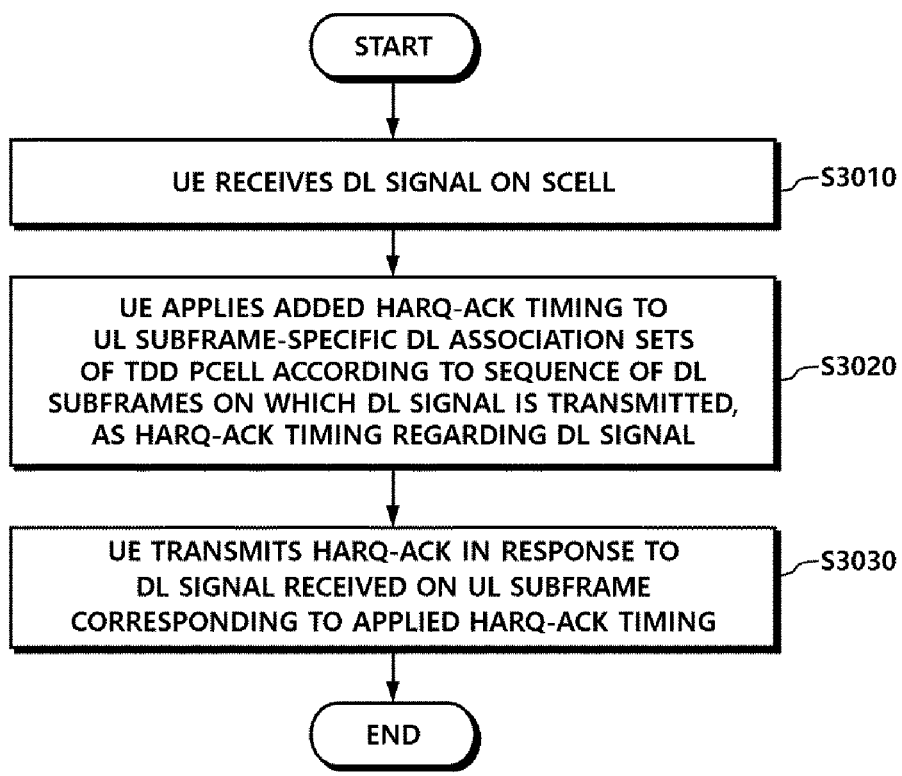
FIG. 30 is a diagram illustrating the operation of user equipment embodying a method a-2-2 according to an embodiment of the present disclosure.

FIG. 30 is a diagram illustrating an operation of a UE for embodying a method a-2-2 according to an embodiment of the present disclosure.

Disclosed is a process of the UE for establishing a DL HARQ-ACK timing in a mobile communications network in which a Pcell is established as a TDD Pcell and a Scell is established as an FDD Scell. In S3010, the UE receives a DL signal on the Scell. In addition, in S3020, as HARQ-ACK timing regarding the DL signal, the UE applies additional HARQ-ACK timing to the UL subframe-specific DL association sets of the TDD Pcell according to the sequence of the DL subframe in which the DL signal is transmitted. Afterwards, in S3030, the UE transmits an HARQ-ACK in response to the received DL signal, on a UL subframe corresponding to the applied HARQ-ACK timing.

The case in which the HARQ-ACK timing regarding the DL signal is distributed to two or more UL subframes when the two or more UL subframes are present within the switch-point periodicity of the TDD Pcell has been discussed with reference to FIG. 14 and the relevant description.

Figure 31:
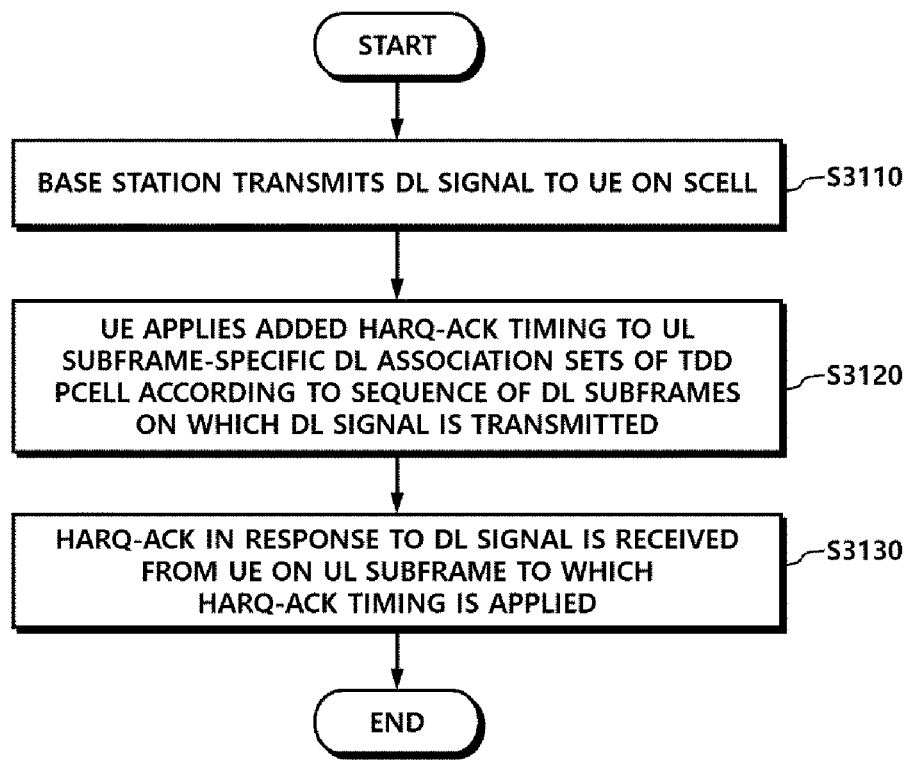
FIG. 31 is a diagram illustrating the operation of a base station embodying a method a-2-2 according to an embodiment of the present disclosure.

FIG. 31 is a diagram illustrating an operation of a base station for embodying a method a-2-2 according to an embodiment of the present disclosure.

FIG. 31 is a diagram illustrating a process of the base station for establishing a DL HARQ-ACK timing in a mobile communications network in which a Pcell is established as a TDD Pcell and a Scell is established as an FDD Scell. In S3110, the base station transmits a DL signal to UE on the Scell. Afterwards, in S3120, the UE applies additional HARQ-ACK timing to UL subframe-specific DL association sets of the TDD Pcell according to the sequence of the DL subframe in which the DL signal is transmitted. In S3130, the base station receives an HARQ-ACK in response to the DL signal from the UE, on the UL subframe to which the HARQ-ACK timing is applied.

The case in which the HARQ-ACK timing regarding the DL signal is distributed to two or more UL subframes when the two or more subframes are present within the switch-point periodicity of the TDD Pcell has been discussed with reference to FIG. 14 and the relevant description.

Figure 32:
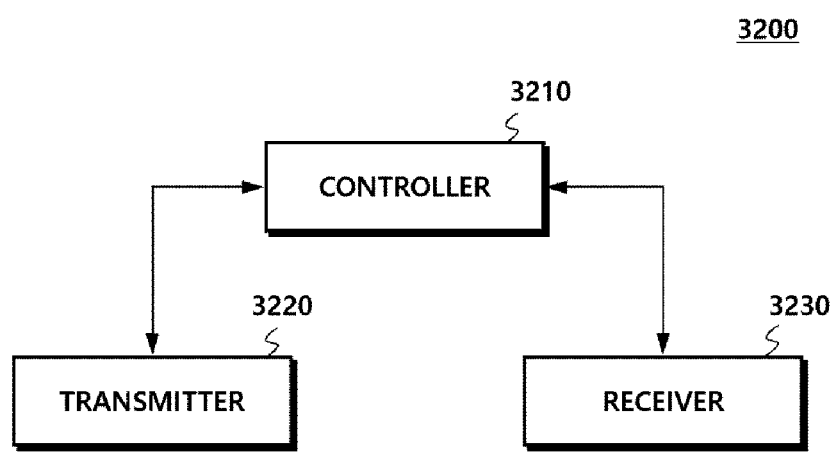
FIG. 32 is a diagram illustrating the configuration of a base station according to a further embodiment.

FIG. 32 is a diagram illustrating a configuration of a base station according to an embodiment.

Referring to FIG. 32, a base station 32 according to the embodiment includes a controller 3210, a transmitter 3220, and a receiver 3230.

The controller 3210 controls the overall operation of the base station at a DL HARQ-ACK timing in the case in which a joint operation and CA of different duplex modes, i.e. FDD and TDD modes, required for carrying out the present disclosure are considered.

The transmitter 3220 and the receiver 3230 are used to transmit signals, messages, and data required for carrying out the present disclosure to the UL and receive signals, messages, and data therefrom.

The base station 3200 establishes a DL HARQ-ACK timing in a TDD-FDD joint operation. More specifically, the transmitter 3220 transmits a DL signal to the UE on the Scell, and the receiver 3230 receives an HARQ-ACK in response to the DL signal from the UE, on a UL subframe to which HARQ-ACK timing established to be used in the duplex mode of the Pcell is applied. In addition, the controller 3210 controls the transmitter 3220 and the receiver 3230.

More specifically, according to an embodiment, when the Pcell is established as an FDD Pcell and the Scell is established as a TDD Scell as in b) above, the UL subframe is a UL subframe to which HARQ-ACK timing established to be used in the FDD Pcell is applied as the HARQ-ACK timing of the TDD S cell. Details embodiments thereof have been described in the method b-1 above.

In the meantime, as in case a) above, when the Pcell is established as a TDD Pcell and the Scell is established as an FDD Scell, the UL subframe is embodied as a UL subframe to which HARQ-ACK timing established to be used in the TDD Pcell is applied as the HARQ-ACK timing of the FDD Scell. According to an alternative embodiment, when the Pcell is established as a TDD Pcell and the Scell is established as an FDD Scell, the UL subframe is a UL subframe in which additional HARQ-ACK timing is applied to the HARQ-ACK timing of the TDD Pcell as the HARQ-ACK of the FDD Scell.

Embodiments of case a) may include the method a-1, the method a-2, the method a-2-1, the method a-2-2, and the like as described above.

More specifically, the base station 3200 establishes DL HARQ-ACK timing in a mobile communications network in which the Pcell is established as a TDD Pcell and the Scell is established as an FDD Scell, the transmitter 3220 transmits a DL signal to the UE on the FDD Scell, and the controller 3210 controls the transmitter 3220 and the receiver 3230.

In the case in which the method a-2-1 is applied, when the interval of switch-point periodicity of UL subframe-specific DL association sets established for the TDD Pcell is K, the receiver 3230 receives the HARQ-ACK in response to the DL signal from the UE, on the UL subframe in which the HARQ-ACK timing to which K is added is applied to the UL subframe-specific DL association sets. Cases in which K is 5 or 10 have been described above with reference to FIG. 11 and the method a-2-1.

When the DL HARQ-ACK timing for the FDD Scell is established on a specific single UL subframe as in FIG. 12 and FIG. 13, the receiver 3230 receives the HARQ-ACK in response to the DL signal from the UE, on the UL subframe in which additional HARQ-ACK timing is applied to a single UL subframe within the switch-point periodicity established for the TDD Pcell. The case in which the single UL subframe is subframe 2 when the interval of switch-point periodicity is 10 subframes has been described with reference to FIG. 12.

When the method a-2-2 is applied, the receiver 3230 receives the HARQ-ACK in response to the DL signal from the UE, on the UL subframe in which HARQ-ACK timing added according to the sequence of the DL subframe in which the DL signal is transmitted is applied to the UL subframe-specific DL association sets of the TDD Pcell. The case in which the HARQ-ACK timing regarding the DL signal is distributed to two or more UL subframes when the two or more UL subframes are present within the switch-point periodicity of the TDD Pcell has been discussed with reference to FIG. 14 and the relevant description.

Figure 33:
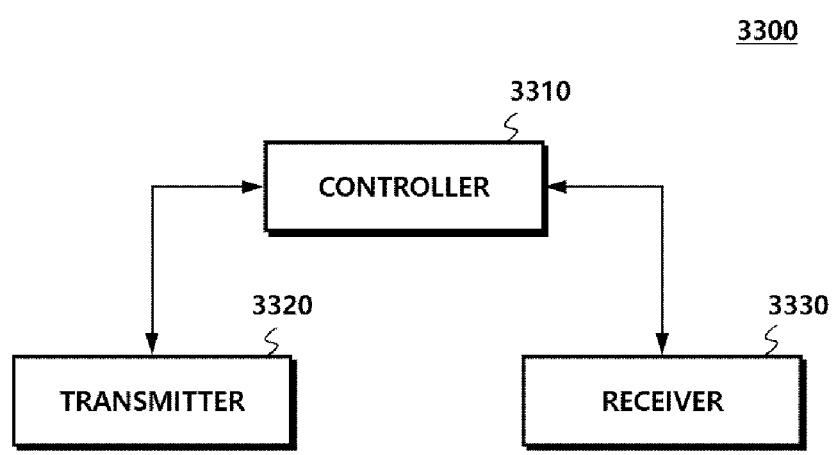
FIG. 33 is a diagram illustrating the configuration of user equipment according to a further embodiment.

FIG. 33 is a diagram illustrating a configuration of a UE according to an embodiment.

Referring to FIG. 33, the UE 3300 according to the embodiment includes a receiver 3330, a controller 3310, and a transmitter 3320.

The receiver 3330 receives DL control information, data, and messages from a base station through a relevant channel.

The controller 3310 controls the overall operation of the UE at a DL HARQ-ACK timing in the case in which a joint operation and CA of different duplex modes, i.e. FDD and TDD modes, required for carrying out the present disclosure are considered.

The transmitter 3320 transmits UL control information, data, and messages to the base station through a relevant channel.

More specifically, the receiver 3330 receives a DL signal on the Scell. The controller 3310 applies HARQ-ACK timing established to be used in the duplex mode of the Pcell as HARQ-ACK timing regarding the received DL signal. Afterwards, the transmitter 3320 transmits an HARQ-ACK in response to the received DL signal, on an UL subframe corresponding to the HARQ-ACK timing applied by the controller 3310.

More specifically, when the Pcell is established as an FDD Pcell and the Scell is established as a TDD Scell as in case b) above, the controller 3310 is embodied to apply the HARQ-ACK timing established to be used in the FDD Pcell as the HARQ-ACK timing of the TDD Scell. Detailed embodiments thereof have been described in the method b-1 above.

In the meantime, as in case a) above, when the Pcell is established as a TDD Pcell and the Scell is established as an FDD Scell, the controller 3310 may apply the HARQ-ACK timing established to be used in the TDD Pcell as the HARQ-ACK timing of the Scell. According to an alternative embodiment, when the Pcell is established as a TDD Pcell and the Scell is established as an FDD Scell, the controller 3310 may apply additional HARQ-ACK timing to the HARQ-ACK timing of the Pcell as the HARQ-ACK timing of the Scell.

Embodiments of case a) may include the method a-1, the method a-2, the method a-2-1, the method a-2-2, and the like as described above.

More specifically, the UE 3300 establishes the DL HARQ-ACK timing in a mobile communications network in which the Pcell is established as a TDD Pcell and the Scell is established as an FDD Scell, and the receiver 3330 receives a DL signal on the FDD Scell.

In the method a-2-1, when the interval of switch-point periodicity of UL subframe-specific DL association sets established for the TDD Pcell is K, the controller 3310 applies the HARQ-ACK timing, in which K is added to the UL subframe-specific DL association sets, as HARQ-ACK timing regarding the DL signal. Cases in which K is 5 or 10 have been described above with reference to FIG. 11 and the method a-2-1.

When the DL HARQ-ACK timing regarding the FDD Scell is established for a specific signal UL subframe as in FIG. 12 and FIG. 13, the controller 3310 applies the HARQ-ACK timing added to a single UL subframe within the switch-point periodicity established for the TDD Pcell as the HARQ-ACK timing regarding the DL signal. The case in which the single UL subframe is subframe 2 when the interval of switch-point periodicity is 10 subframes has been described with reference to FIG. 12.

In the case in which the method a-2-1 is applied, the controller 3310 applies the additional HARQ-ACK timing to the UL subframe-specific DL association sets of the TDD Pcell according to the sequence of the DL subframe in which the DL signal is transmitted, as the HARQ-ACK timing regarding the DL signal. The case in which the HARQ-ACK timing regarding the DL signal is distributed to two or more UL subframes when the two or more UL subframes are present within the switch-point periodicity of the TDD Pcell has been discussed with reference to FIG. 14 and the relevant description.

The embodiments of the present disclosure as described above are summarized as follows: The present disclosure provides a method of establishing DL HARQ-ACK timing when a Pcell and a Scell having different duplex modes are established for a UE. The method includes: receiving, by the UE, a DL signal on the Scell; and applying, by the UE, HARQ-ACK timing established to be used in the duplex mode of the Pcell as HARQ-ACK timing regarding the received DL signal. When the Pcell is established as an FDD Pcell and the Scell is established as a TDD Scell, applying the HARQ-ACK timing includes applying additional HARQ-ACK timing to the HARQ-ACK timing of the Pcell as the HARQ-ACK timing of the Scell.

In addition, the present disclosure provides a method of establishing DL HARQ-ACK timing when establishing a Pcell and a S cell having different duplex modes for a UE. The method includes: transmitting, by a base station, a DL signal to the UE on the Scell; and receiving, by the base station, an HARQ-ACK in response to the DL signal from the UE, on an UL subframe to which HARQ-ACK timing established to be used in the duplex mode of the Pcell is applied. When the Pcell is established as a TDD Pcell and the Scell is established as an FDD Scell, applying the HARQ-ACK timing includes applying additional HARQ- ACK timing to the HARQ-ACK timing of the Pcell as the HARQ-ACK timing of the Scell.

Furthermore, the present disclosure provides a UE for establishing DL HARQ-ACK timing when a Pcell and a Scell having different duplex modes are established for the UE. The UE includes: a receiver configured to receive a DL signal on the second cell; and a controller configured to apply HARQ-ACK timing established to be used in the duplex mode of the Pcell as HARQ-ACK timing regarding the received DL signal. When the Pcell is established as a TDD Pcell and the Scell is established as an FDD Scell, the controller applies the HARQ-ACK timing established to be used in the FDD Pcell as the HARQ-ACK timing of the TDD Scell. In addition, when the Pcell is established as a TDD Pcell and the Scell is established as an FDD S cell, the controller applies the HARQ-ACK timing established to be used in the TDD Pcell as the HARQ-ACK timing of the Scell. Furthermore, when the Pcell is established as a TDD Pcell and the Scell is established as an FDD Scell, the controller applies additional HARQ-ACK timing to the HARQ-ACK timing of the Pcell as the HARQ-ACK timing of the Scell.

In addition, the present disclosure provides a UE for establishing DL HARQ-ACK timing in a mobile communications network in which a Pcell is established as a TDD Pcell and a Scell is established is established as an FDD Scell. The user equipment includes: a receiver configured to receive a downlink signal on the FDD secondary cell; and a controller. When an interval of a switch-point periodicity of an UL subframe-specific DL association set established for the TDD Pcell is K, the controller is configured to apply HARQ-ACK timing in which the K is added to the UL subframe-specific DL association set, as HARQ-ACK timing regarding the DL signal.

Furthermore, the present disclosure provides the UE for establishing DL HARQ-ACK timing in a mobile communications network in which a Pcell is established as a TDD Pcell and a Scell is established is established as an FDD Scell. The UE includes: a receiver configured to receive a downlink signal on the FDD secondary cell; and a controller configured to apply added HARQ-ACK timing to an UL subframe-specific DL association set of the TDD Pcell according to a sequence of a DL subframe in which the DL signal is transmitted, as HARQ-ACK timing regarding the DL signal. When the interval of the switch-point periodicity is 10 subframes, the single UL subframe is subframe 2.

In addition, the present disclosure provides a UE for establishing DL HARQ-ACK timing in a mobile communications network in which a Pcell is established as a TDD Pcell and a Scell is established is established as an FDD Scell. The UE includes: a receiver configured to receive a downlink signal on the FDD secondary cell; and a controller configured to apply added HARQ-ACK timing to an UL subframe-specific DL association set of the TDD Pcell according to a sequence of a DL subframe in which the DL signal is transmitted, as HARQ-ACK timing regarding the DL signal. When two or more UL subframes are present within the switch-point periodicity of the TDD Pcell, the HARQ-ACK timing regarding the DL signal is distributed to the two or more UL subframes.

Furthermore, the present disclosure provides a base station for establishing DL HARQ-ACK timing when a Pcell and a Scell having different duplex modes are established for UE. The base station includes: a transmitter configured to transmit a DL signal to the UE on the Scell; a receiver configured to receive an HARQ-ACK in response to the DL signal from the UE on an UL subframe to which HARQ-ACK timing established to be used in the duplex mode of the Pcell is applied. When the Pcell is established as an FDD Pcell and the Scell is established as a TDD Scell, the UL subframe is an UL subframe to which HARQ-ACK timing established to be used in the FDD Pcell is applied as HARQ-ACK of the TDD Scell. When the Pcell is established as a TDD Pcell and the Scell is established as an FDD Scell, the UL subframe is an UL subframe to which HARQ-ACK timing established to be used in the TDD Pcell is added as HARQ-ACK timing of the FDD Scell. When the Pcell is established as a TDD Pcell and the Scell is established as an FDD Scell, the UL subframe is a UL subframe in which additional HARQ-ACK timing is applied to the HARQ-ACK timing of the TDD Pcell as the HARQ-ACK of the FDD S cell.

In addition, the present disclosure provides a base station for establishing DL HARQ-ACK timing in a mobile communications network in which a Pcell is established as a TDD Pcell and a Scell is established is established as an FDD Scell. The base station includes: a transmitter configured to transmit a DL signal to the UE on the FDD Scell; a receiver, wherein, when an interval of a switch-point periodicity of an UL subframe-specific DL association set established for the TDD Pcell is K, the receiver is configured to receive HARQ-ACK timing regarding the DL signal from the UE, on an UL subframe to which HARQ-ACK timing in which the K is added to the UL subframe-specific DL association set is applied; and a controller configured to control the transmitter and the receiver. The K is 5 or 10.

Furthermore, the present disclosure provides a base station for establishing DL HARQ-ACK timing in a mobile communications network in which a Pcell is established as a TDD Pcell and a Scell is established as an FDD Scell. The base station includes: a transmitter configured to transmit a DL signal to the UE on the Scell; a receiver, wherein, when an interval of a switch-point periodicity of an UL subframe-specific DL association set established for the TDD Pcell is K, the base station receive HARQ-ACK timing regarding the DL signal from the UE, on an UL subframe to which HARQ-ACK timing in which the K is added to the UL subframe-specific DL association set is applied; and a controller configured to control the transmitter and the receiver. When the interval of the switch-point periodicity is 10 subframes, the single UL subframe is subframe 2.

In addition, the present disclosure provides the base station for establishing DL HARQ-ACK timing in a mobile communications network in which a Pcell is established as a TDD Pcell and a Scell is established as an FDD Scell. The base station includes: a transmitter configured to transmit a DL signal to the UE on the Scell; a receiver configured to receive an HARQ-ACK in response to the DL signal from the UE, on an UL subframe in which added HARQ-ACK timing is applied to an UL subframe-specific DL association set of the TDD Pcell according to a sequence of a DL subframe in which the DL signal is transmitted; and a controller configured to control the transmitter and the receiver. When two or more UL subframes are present within the switch-point periodicity of the TDD Pcell, the HARQ-ACK timing regarding the DL signal is distributed to the two or more UL subframes.

The embodiments of the present disclosure as set forth above propose the operations and configurations of the UE and the base station realizing DL HARQ-ACK timing when the joint operation and CA of different duplex modes, i.e. TDD and FDD, are considered.

The foregoing descriptions and the accompanying drawings have been presented in order to explain the certain principles of the present invention. A person skilled in the art to which the invention relates can make many modifications and variations by combining, dividing, substituting for, or changing the elements without departing from the principle of the invention. The foregoing embodiments disclosed herein shall be interpreted as illustrative only but not as limitative of the principle and scope of the invention. It should be understood that the scope of the invention shall be defined by the appended Claims and all of their equivalents fall within the scope of the invention.

The invention claimed is:

1. A method of establishing, by a user equipment, downlink HARQ-ACK timing when the primary cell is established as a time division duplex (TDD) primary cell and the secondary cell is established as a frequency division duplex (FDD) secondary cell for the user equipment, the method comprising:
    receiving, by the user equipment, a downlink signal on the FDD secondary cell; and
    applying, by the user equipment, HARQ-ACK timing included in an uplink subframe-specific downlink association set established to be used in the TDD primary cell, as HARQ-ACK timing for the downlink signal received on the FDD secondary cell,
    wherein the applying of the HARQ-ACK timing comprises when an interval of a switch-point periodicity of an uplink subframe-specific downlink association set established for the TDD primary cell is K which is one of 5 and 10, applying, in the user equipment, HARQ-ACK timing in which the K is added to the uplink subframe-specific downlink association set, and
    wherein the applying of the HARQ-ACK timing comprises: applying, by the user equipment, HARQ-ACK timing added to a single uplink subframe within the switch-point periodicity established for the TDD primary cell, and when the interval of the switch-point is 10 subframes, the added single uplink subframe is a subframe 2, and when the interval of the switch-point is 5 subframes, the added single uplink subframe is a subframe 3.

2. The method according to claim 1, wherein, when two or more uplink subframes are present within a switch-point periodicity of the TDD primary cell, the HARQ-ACK timing regarding the downlink signal is distributed to the two or more uplink subframes.

3. A method of establishing, by a base station, downlink HARQ-ACK timing when the primary cell is established as a time division duplex (TDD) primary cell and the secondary cell is established as a frequency division duplex (FDD) secondary cell for the user equipment, the method comprising:
    transmitting, by the base station, a downlink signal to the user equipment on the FDD secondary cell; and
    receiving, by the base station through the TDD primary cell, an HARQ-ACK in response to the downlink signal from the user equipment, on an uplink subframe to which HARQ-ACK timing included in an uplink subframe-specific downlink association set established to be used in the TDD primary cell, as HARQ-ACK timing for the downlink signal received on the FDD secondary cell,
    wherein the applying of the HARQ-ACK timing comprises when an interval of a switch-point periodicity of an uplink subframe-specific downlink association set established for the TDD primary cell is K which is one of 5 and 10, applying, in the user equipment, HARQ-ACK timing in which the K is added to the uplink subframe-specific downlink association set, and
    wherein the applying of the HARQ-ACK timing comprises: applying, by the user equipment, HARQ-ACK timing added to a single uplink subframe within the switch-point periodicity established for the TDD primary cell, and when the interval of the switch-point is 10 subframes, the added single uplink subframe is a subframe 2, and when the interval of the switch-point is 5 subframes, the added single uplink subframe is a subframe 3.

4. The method according to claim 3, wherein, when two or more uplink subframes are present within a switch-point periodicity of the TDD primary cell, HARQ-ACK timing regarding the downlink signal is distributed to the two or more uplink subframes.

5. A user equipment for establishing downlink HARQ-ACK timing when a primary cell and a secondary cell having different duplex modes are established for the user equipment, the user equipment comprising:
    a receiver configured to receive a downlink signal on the second cell; and
    a controller configured to apply HARQ-ACK timing included in an uplink subframe-specific downlink association set established to be used in the TDD primary cell, as HARQ-ACK timing for the downlink signal received on the FDD secondary cell,
    wherein the applying of the HARQ-ACK timing comprises when an interval of a switch-point periodicity of an uplink subframe-specific downlink association set established for the TDD primary cell is K which is one of 5 and 10, applying, in the user equipment, HARQ-ACK timing in which the K is added to the uplink subframe-specific downlink association set, and
    wherein the applying of the HARQ-ACK timing comprises: applying, by the user equipment, HARQ-ACK timing added to a single uplink subframe within the switch-point periodicity established for the TDD primary cell, and when the interval of the switch-point is 10 subframes, the added single uplink subframe is a subframe 2, and when the interval of the switch-point is 5 subframes, the added single uplink subframe is a subframe 3.

6. The user equipment according to claim 5, wherein when two or more uplink subframes are present within a switch-point periodicity of the TDD primary cell, the HARQ-ACK timing regarding the downlink signal is distributed to the two or more uplink subframe.

* * * * *